United States Patent
Aki et al.

(10) Patent No.: US 11,232,407 B1
(45) Date of Patent: Jan. 25, 2022

(54) SYSTEM AND METHOD OF ASSESSING SENTIMENT OF AN ORGANIZATION

(71) Applicant: Anthem, Inc., Indianapolis, IN (US)

(72) Inventors: Ramesh Aki, Woodbury, MN (US); Joseph P. Knytych, Orland Park, IL (US); Sanjeeva Kodimala, Woodbury, MN (US); Michael J. Zerhusen, Cincinnati, OH (US)

(73) Assignee: Anthem, Inc., Indianapolis, IN (US)

( * ) Notice: Subject to any disclaimer, the term of this patent is extended or adjusted under 35 U.S.C. 154(b) by 324 days.

(21) Appl. No.: 16/294,008

(22) Filed: Mar. 6, 2019

(51) Int. Cl.
*G06Q 10/10* (2012.01)
*G06Q 10/08* (2012.01)
(Continued)

(52) U.S. Cl.
CPC ....... *G06Q 10/105* (2013.01); *G06F 3/04817* (2013.01); *H04L 51/046* (2013.01)

(58) Field of Classification Search
CPC .. G06Q 10/105; G06F 3/04817; H04L 51/046
(Continued)

(56) References Cited

U.S. PATENT DOCUMENTS 9,720,707 B1 * 8/2017 Shook ................. G06Q 10/105
9,852,399 B1 * 12/2017 Casale ................ G06F 3/04842
(Continued)

*Primary Examiner* — Jonathan P Ouellette
(74) *Attorney, Agent, or Firm* — Morgan, Lewis & Bockius LLP

(57) ABSTRACT

A method including, at a first electronic device including a user-input device and a display, authenticating a user of the first electronic device to connect to a network. In response to authenticating the user, the method includes generating user credentials indicative of authorization of the user to the network, displaying a home screen including a system tray, the system tray including a system tray icon, detecting a first input indicative of a selection of the system tray icon on the system tray. In response to detecting the first input indicative of the selection of the system tray icon, the method includes displaying a status submission user interface overlaid on the home screen, the status submission user interface including a plurality of user-sentiment icons. After detecting a second input indicative of a selection of one of the user-sentiment icons, the method includes transmitting, to a server device, status data associated with the user credentials, a time when the second input occurred, and user-sentiment data associated with the selected user-sentiment icon. While displaying the status submission user interface, the method includes detecting a third input indicative of a selection to display reporting data In response to detecting the third input to display reporting data, the method includes requesting reporting data from the server device, and receiving and displaying a reporting user interface including the reporting data for one or more users in the organization, the reporting data including at least one of a count of a number of instances where a respective user-sentiment icon of a plurality of user-sentiment icons was previously selected by the one or more users, and a percentage of the number of instances where the respective user-sentiment icon was previously selected by the one or more users relative to the other user-sentiment icons.

20 Claims, 23 Drawing Sheets

(51) Int. Cl.
*G06Q 30/02* (2012.01)
*G06Q 30/08* (2012.01)
*G06F 3/0481* (2013.01)
*H04L 12/58* (2006.01)

(58) Field of Classification Search
USPC .......................................... 705/1.1–912, 320
See application file for complete search history.

(56) References Cited

U.S. PATENT DOCUMENTS

| | | | | |
|---|---|---|---|---|
| 2003/0050834 A1* | 3/2003 | Caplan | H04N 21/47202 | 705/14.14 |
| 2005/0021388 A1* | 1/2005 | Hatcher | G06Q 30/02 | 705/7.32 |
| 2009/0089154 A1* | 4/2009 | Dion | G06Q 10/00 | 705/7.42 |
| 2009/0327051 A1* | 12/2009 | Nerby | G06Q 30/0203 | 705/7.32 |
| 2010/0100427 A1* | 4/2010 | McKeown | G06Q 10/1057 | 705/322 |
| 2010/0153453 A1* | 6/2010 | Knowles | G06Q 10/107 | 707/784 |
| 2010/0235776 A1* | 9/2010 | Brown | G06Q 10/10 | 715/772 |
| 2012/0047000 A1* | 2/2012 | O'Shea | G06Q 10/06398 | 705/7.42 |
| 2012/0047447 A1* | 2/2012 | Haq | G06F 3/04847 | 715/752 |
| 2013/0311190 A1* | 11/2013 | Reiner | G10L 25/48 | 704/270 |
| 2014/0100922 A1* | 4/2014 | Aycock | G06Q 10/0639 | 705/7.38 |
| 2014/0143693 A1* | 5/2014 | Goossens | G06Q 10/10 | 715/764 |
| 2015/0242780 A1* | 8/2015 | Besner | G06Q 10/0637 | 705/7.36 |
| 2015/0269244 A1* | 9/2015 | Qamar | G06Q 10/06398 | 705/7.42 |
| 2015/0339938 A1* | 11/2015 | Sampath | G09B 7/02 | 434/362 |
| 2016/0100019 A1* | 4/2016 | Leondires | H04L 63/105 | 709/204 |
| 2016/0210711 A1* | 7/2016 | Krupa | G16H 40/63 | |
| 2017/0083506 A1* | 3/2017 | Liu | G06F 40/166 | |
| 2017/0116555 A1* | 4/2017 | Griffin | G06Q 10/1091 | |
| 2017/0118303 A1* | 4/2017 | Ratiu | G06Q 30/0244 | |
| 2017/0278067 A1* | 9/2017 | Cunico | G06Q 10/06398 | |
| 2018/0005161 A1* | 1/2018 | Cong | G06Q 10/06398 | |
| 2018/0189691 A1* | 7/2018 | Oehrle | G06Q 10/063 | |
| 2018/0218289 A1* | 8/2018 | Albrecht | G06Q 10/00 | |
| 2018/0309631 A1* | 10/2018 | Li | H04L 51/36 | |
| 2019/0228357 A1* | 7/2019 | Fisher | G06N 7/005 | |
| 2020/0234208 A1* | 7/2020 | Childress | G06Q 10/06 | |
| 2020/0364672 A1* | 11/2020 | Cheung | G06Q 30/0203 | |

* cited by examiner

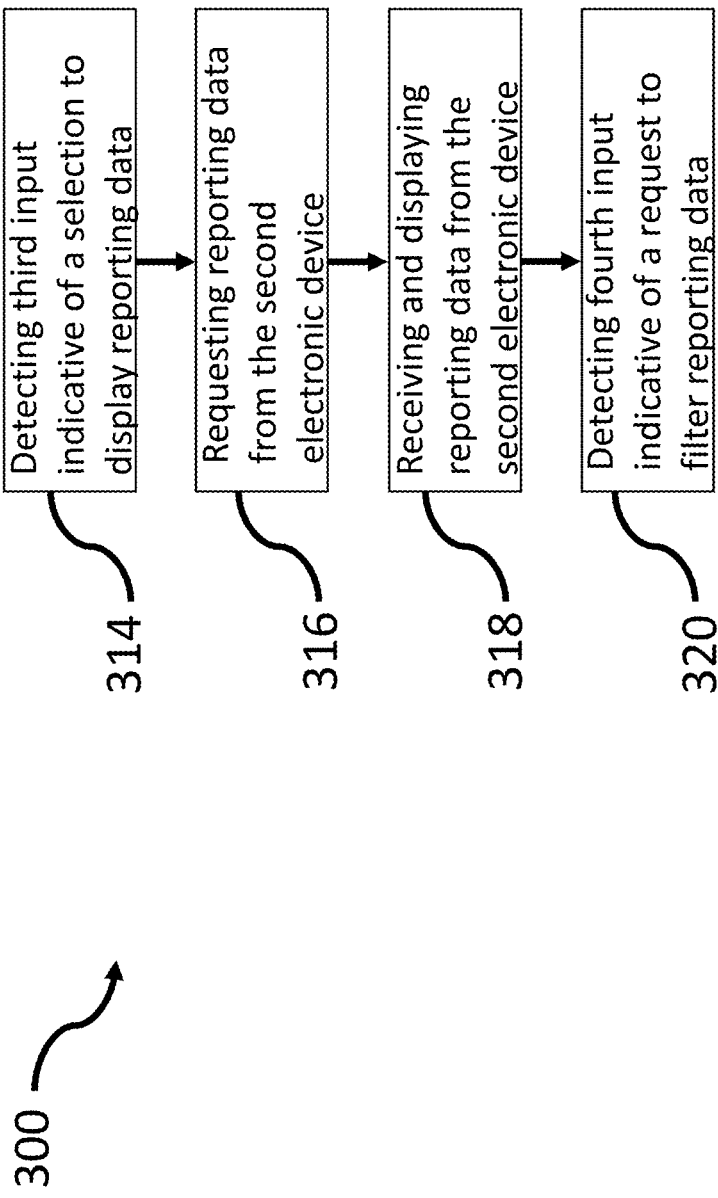

US 11,232,407 B1

SYSTEM AND METHOD OF ASSESSING SENTIMENT OF AN ORGANIZATION

BACKGROUND OF THE INVENTION

The present invention generally relates to a system and method of assessing sentiment of an organization and, more particularly, to a system and method of receiving and transmitting real-time information regarding an employee's sentiment status.

BRIEF SUMMARY OF THE INVENTION

Embodiments of the present invention can provide a method, the method including at a first electronic device including a user-input device and a display, authenticating a user of the first electronic device to connect to a network, in response to authenticating the user, generating user credentials indicative of authorization of the user to access the network, displaying a home screen including a system tray. The system tray may include a system tray icon. The method may also include detecting a first input indicative of a selection of the system tray icon on the system tray, and in response to detecting the first input indicative of the selection of the system tray icon, displaying a status submission user interface overlaid on the home screen, the status submission user interface including a plurality of user-sentiment icons. Each of the plurality of user-sentiment icons may correspond to one numerical value on a numerical value scale indicative of the sentiment of the user. Further, the method may include, after detecting a second input indicative of a selection of one of the user-sentiment icons, transmitting, to a server device, status data associated with the user credentials, a time when the second input was detected, and user-sentiment data associated with the selected user-sentiment icon. While displaying the status submission user interface, the method may further include detecting a third input indicative of a selection to display reporting data, in response to detecting the third input to display reporting data, requesting reporting data from the second electronic device, and receiving and displaying a reporting user interface including the reporting data for one or more users in the organization. The reporting data may include at least one of: a count of a number of instances where a respective user-sentiment icon of a plurality of user-sentiment icons was previously selected by the one or more users, and a percentage of the number of instances where the respective user-sentiment icon was previously selected by the one or more users relative to the other user-sentiment icons.

In some embodiments, the reporting data for one or more users may be a function of the user credentials of the user. The user credentials may include credentials of at least one of: one or more employees that are the responsibility of the user, a manager of the user, and an organizational role of the user. Further, the user credentials may include at least one of: location, age, sex, and ethnicity. The reporting data for one or more users may be generated for at least one of: the user requesting reporting data, and one or more employees that are the responsibility of the user.

In some embodiments, the status submission user interface may include a text input box configured to receive a user-sentiment text input from the user indicative of user sentiment of the user.

In some embodiments, the method may include, while displaying a reporting user interface including the reporting data for one or more users in the organization, receiving a fourth input to filter the reporting data displayed on the reporting user interface to within a time period.

In some embodiments, the method may include, while displaying a reporting user interface including the reporting data for one or more users in the organization, receiving a fifth input to filter the reporting data displayed on the reporting user interface to a subset, less than all, of the one or more employees that are the responsibility of the user.

In some embodiments, the method may include, while displaying a reporting user interface including the reporting data for one or more users in the organization, receiving a sixth input to display one or more user-sentiment text inputs provided by one or more employees that are the responsibility of the user.

In some embodiments, the method may include, while displaying a reporting user interface including the reporting data for one or more users in the organization, receiving a seventh input to display, on the reporting user interface reporting data for a subset, less than all, of the one or more employees that are the responsibility of the user concurrently with reporting data for all of the employees of the organization.

In some embodiments, the method may include, while displaying a reporting user interface including the reporting data for one or more users in the organization, receiving an eighth input to display, on the reporting user interface reporting data for the one or more employees that are the responsibility of the user at one or more time instances over a time period.

In some embodiments, the user may be a member of an organization having an organizational hierarchy.

Another embodiment of the present invention can provide a method of presenting organizational sentiment to an authorized, comprising authenticating one or more first users on respective first electronic devices, wherein the one or more first users are members of an organization, rendering, on the first electronic devices, a display that includes a status submission user interface including a plurality of user-sentiment icons, detecting, on each of the respective first user devices, a selection of one of the user-sentiment icons, transmitting, by the respective first user devices, to a server, status data associated with the authenticated first users of the each of respective first electronic devices and the detected selection of one of the user-sentiment icons to a server, authenticating a second user on a second electronic device, wherein the second user is a member of the organization, and receiving, at the server, instructions associated with the second electronic device to render on a display of the second electronic device, reporting data associated with the status data. The reporting data may include an indication of a number of times each one of plurality of user-sentiment icons was selected by the first users based upon the first users' position in the organization, rendering, on the display of the second electronic device, the reporting data, and without receiving additional instructions to render a display on the second electronic device, updating the reporting data displayed on the second electronic device to reflect status data transmitted to the server after the receiving at the server of instructions associated with the second electronic device to render on the display of the second electronic device, the reporting data.

In some embodiment, the reporting data may be rendered on the display of the second electronic device is rendered as an active user interface that is selectable to display further information about the reporting data.

In some embodiments, the status submission user interface may be configured to receive text input from the respective first user and the further information about the reporting data includes at least a portion of the text input.

BRIEF DESCRIPTION OF THE SEVERAL VIEWS OF THE DRAWINGS

The foregoing summary, as well as the following detailed description of embodiments of the method, will be better understood when read in conjunction with the appended drawings of an exemplary embodiment. It should be understood, however, that the invention is not limited to the precise arrangements and instrumentalities shown.

In the drawings:

FIG. 5B illustrates an exemplary flow chart representing a method for assessing sentiment of a group or organization of people in accordance with an exemplary embodiment of the present invention.

DETAILED DESCRIPTION OF THE INVENTION

Figure 1:
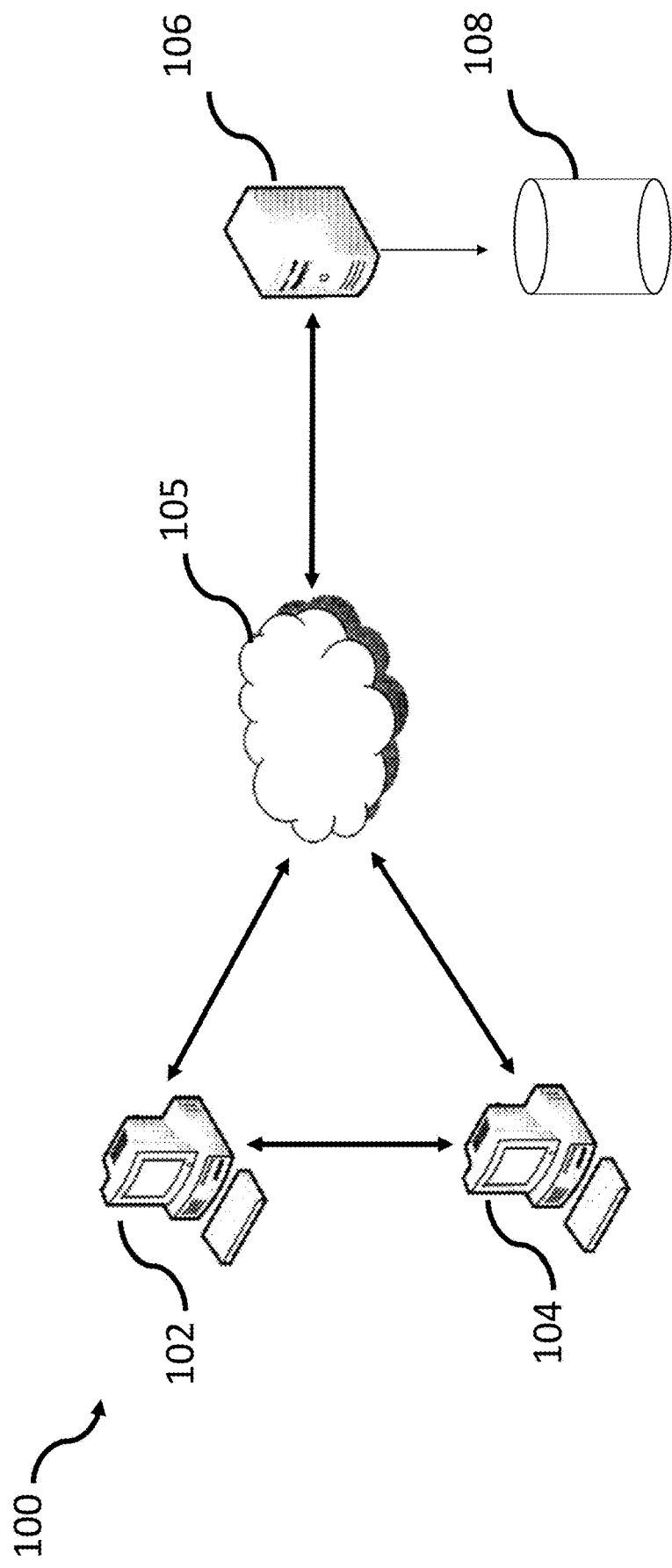
FIG. 1 is a system diagram in accordance with an exemplary embodiment of the present invention.

Referring to the drawings in detail, wherein like reference numerals indicate like elements throughout, there is shown in FIGS. 1-5B an exemplary system and method of assessing sentiment of a group or organization of people of an organization, generally designated, in accordance with an exemplary embodiment of the present invention. In use, the exemplary system and method shown in FIGS. 1-5B may be used to assess the real-time status of individuals, such as employees, of an organization. The exemplary method may allow managers and senior leadership of the individuals to view the real-time status of all the individual under their management.

In some embodiments, the exemplary system and method provide "always on" functionality where features of the system are easily accessible and available by associates on desktop, taskbar etc.

In some embodiments, the exemplary system and method provide users with voluntary and unprompted daily feedback. Users can participate periodically (e.g., daily) however participation may be voluntary.

In some embodiments, the exemplary system and method provide functionality to change a submission—users can, for example, change their submission throughout the day if so desired.

In some embodiments, the exemplary system and method provide users reports that display submissions that may include submissions made by the user (alone or together with other user submissions). User reporting functionality can build credibility since the users can see that their feedback was saved by the system.

In some embodiments, the exemplary system and method provide real-time manager level reporting where managers can have access to their team's sentiment results.

In some embodiments, the exemplary system and method provide real-time reporting of group leaders (managers of managers). In some embodiments, all levels of leadership can view results of employees in their organization.

In some embodiments, the exemplary system and method provide simple, one-click emoji smiley rating with a field for comments.

In some embodiments, the exemplary system and method provide customized reporting views. For example, reporting created within the system can be focused on key measures of participation and percent favorable ratings.

In some embodiments, the exemplary system and method provide reminder notifications to participate where a periodic notification is displayed on the user's computer device reminding the user to participate.

In some embodiments, the exemplary system and method provide a novel survey user interface that is user friendly and user intuitive (e.g., emojis)

In some embodiments, the exemplary system and method provide integration with internal employee data (organizational hierarchy, employee attributes).

In some embodiments, the exemplary system and method provide for in-application manager to subordinate messaging.

In some embodiments, the exemplary system and method provide flexibility for users to give feedback on anything to everything the user can think of. This flexibility will give an enterprise visibility into many aspects of the enterprise's functioning and ability to proactively address any deficiencies which puts the enterprise in a competitive advantageous position.

In some embodiments, the exemplary system and method provide the ability and a tool for employees and managers to communicate and collaborate in near-real time, becoming a channel to help solve issues quickly.

In some embodiments, the exemplary system and method provide overall cost reduction for organizations by integrating with existing databases that track employees and existing enterprise computing components (e.g., servers), among other things.

Referring to FIG. 1, system 100 for assessing sentiment of a group or organization of people. The group of people may be organized in a hierarchy. where each person may have one or more direct reports from one or more subordinates or report to one or more managers. System 100 may include first electronic device 102, second electronic device 104, server 106, and database 108. In an embodiment, first electronic device 102, second electronic device 104, server 106, and database 108 may be coupled to a network 105 allowing for communication between first electronic device 102, second electronic device 104, server 106, and database 108. For example, first electronic device 102 and second electronic device 104 may be configured to communicate with one another. Although system 100 shows only two electronic devices, system 100 may include more than two electronic devices. For example, system 100 may include, three, four, five, or any number of electronic devices desired. First electronic device 102 and second electronic device 104 may be a personal computer, a laptop, a tablet, or a mobile device. First electronic device 102 and second electronic device 104 may include one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

In an embodiment, first electronic device 102 and second electronic device 104 each include a display configured to display user interfaces. First electronic device 102 and second electronic device 104 also include user input devices (e.g., mouse, keyboard, touchscreen) for interaction by an end user. Input device 104 may be the display configured to display user interfaces. First electronic device 102 and second electronic device 104 may be configured to communicate with server 106. Server 106 may be configured to receive data requests from electronic devices 102, 104 and transmit responses to electronic devices 102, 104. Server 106 may be configured to authenticate a user of electronic device 102 or 104. Server 106 may be communicatively coupled to database 108. Database 108 may include all members of an organization and the hierarchal relationship between all the members of the organization. For example, database 108 may include data relating to members and relationships of the teams, groups, managers, leaders, direct reports, senior leadership, and/or executive members.

FIGS. 2A-2M illustrate exemplary user interfaces of the present invention to that are configured to submit user sentiment and display sentiment reports. FIGS. 2A-2M illustrate exemplary user interface 202 which may be displayed on first electronic device 102 and/or second electronic device 104. User interface 202 may be displayed on a desktop computer, laptop, tablet, or a mobile device. User interface 202 may include system tray 204, which may include system tray icon 206. In an embodiment, system tray icon 206 is an icon for an application on a mobile device. A user of an organization may select system tray icon 206.

Figure 2A:
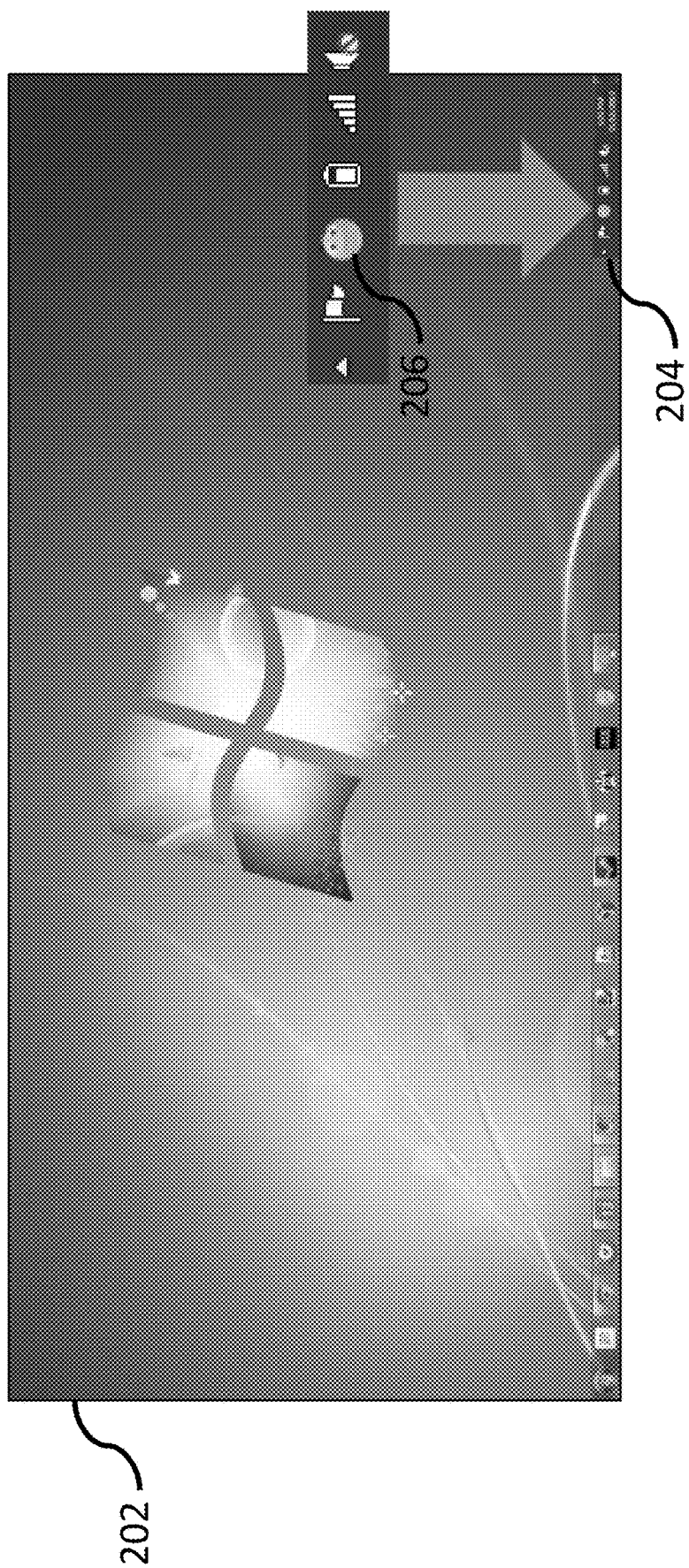
FIGS. 2A-4C illustrate exemplary user interfaces for submitting user sentiment, displaying sentiment reports of a group or organization of people, assessing sentiment of a group or organization of people, and transmitting messages between users, in accordance with an exemplary embodiment of the present invention.
Figure 2B:
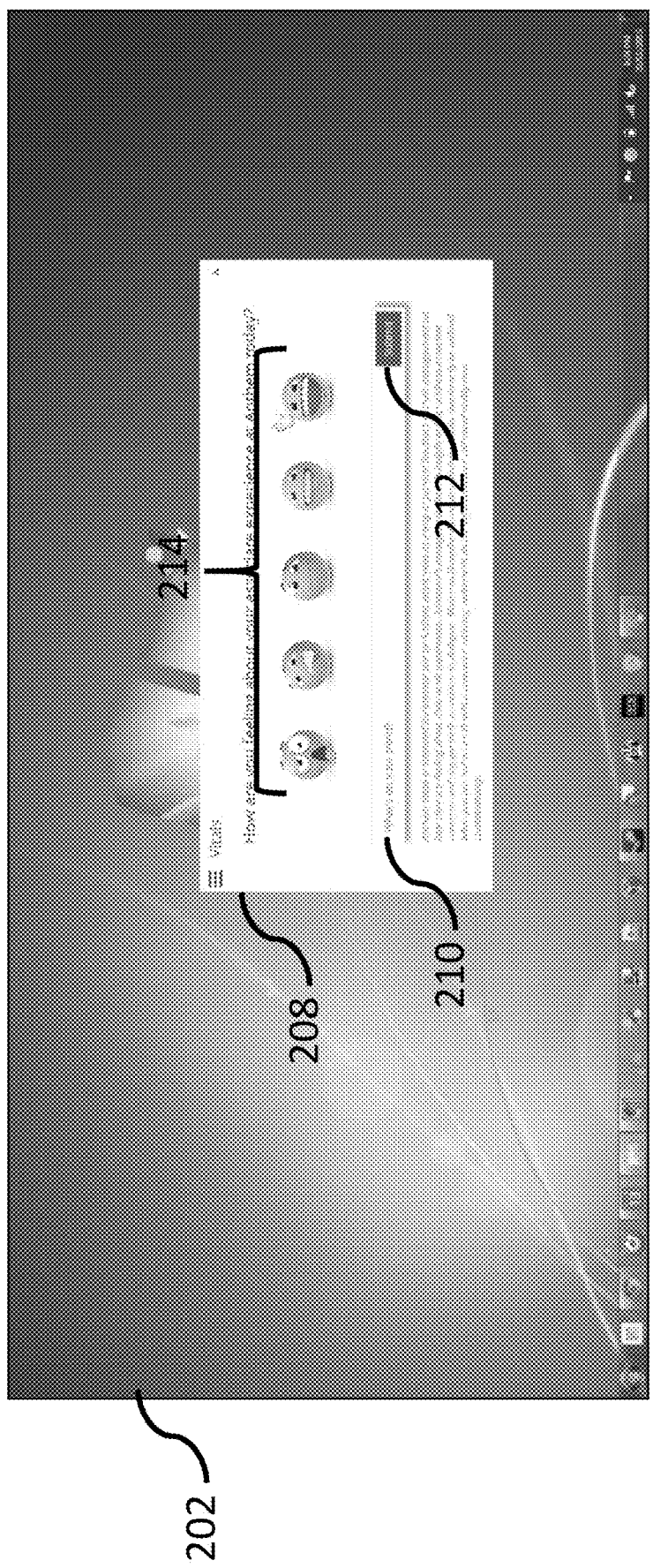

In one example, tray icon 206 (FIG. 2A) is selectable via user interface 202 to call for display user interface object 208 (FIG. 2B). User interface object 208 may include one or more of user input field 210, a plurality of user-sentiment icons 214, user readable text and input submission object 212. In one embodiment, a user is prompted to interact with of the user input field or one or more of the graphical images to convey user sentiment. In some embodiments, displaying of any user interface object or any component thereof described herein includes electronic device 102, 104 transmitting a request for a user interface from server 106 and server 106 providing the requested user interface to the electronic device 102, 104. The plurality of user-sentiment icons 214 may include icons representing various sentiments, such as emotions. For example, plurality of user-sentiment icons 214 may include "Emoji's", or graphical images depicting emotions such as exhaustion, concern, content, happy, or excited. Each of the plurality of user-sentiment icons may correspond to one numerical value on a numerical value scale indicative of the sentiment of the user. Interface 202 may be configured to allow a user to select one of plurality of user-sentiment icons 214 indicating their current, real-time sentiment. User input field is configured to accept characters input into user input field 210 that may correspond to a user selection of one of the plurality of user-sentiment icons 214. Interface 202 may be configured to allow a user to select input submission object 212 of user interface object 208 once they have made their selection and/or entered information in input field 210.

Figure 2C:
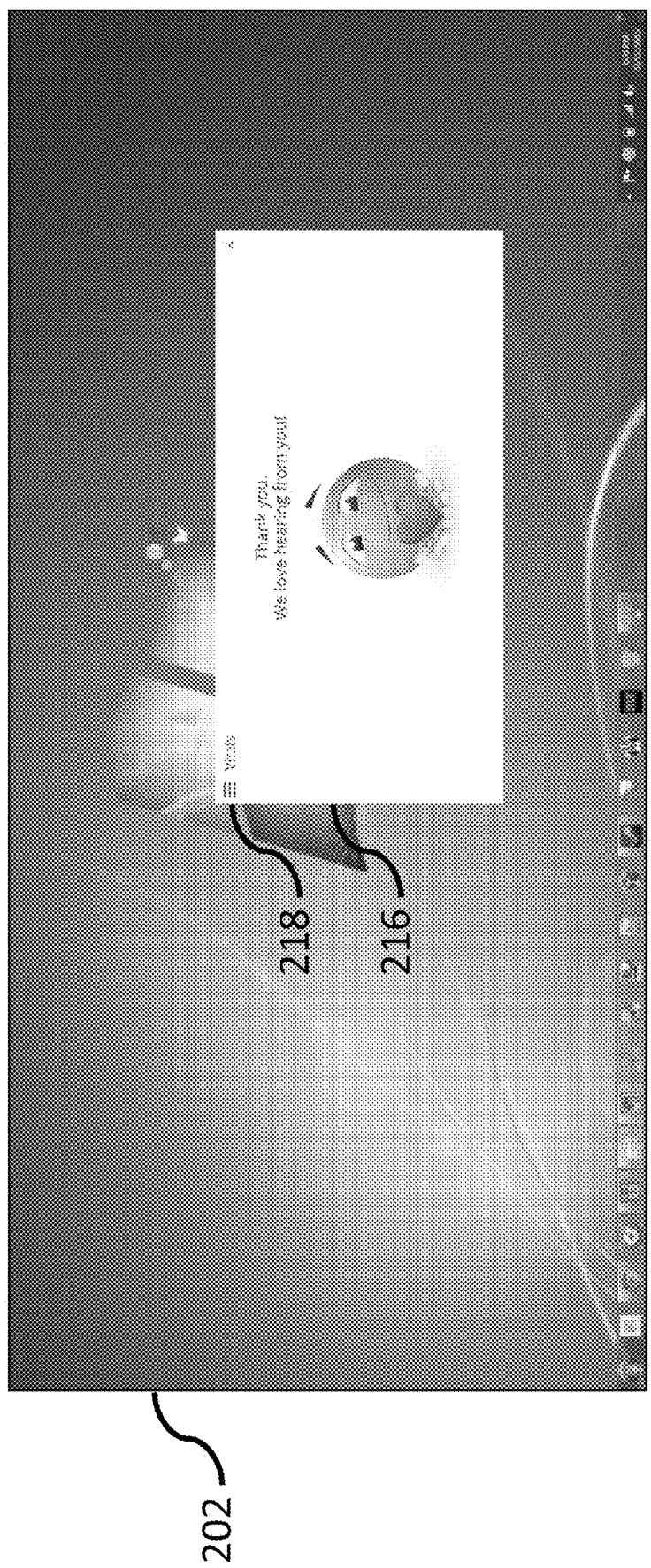

After input submission object 212 of user interface object 208 in FIG. 2B has been selected, user interface object 216, illustrated in FIG. 2C, may be displayed on user interface 202. User interface object 216 may contain a message responding to the user input illustrated in FIG. 2B such as a thank you to the user for indicating their current, real-time status. User interface object 216 may include menu 218 that may be selected by a user.

Figure 2D:
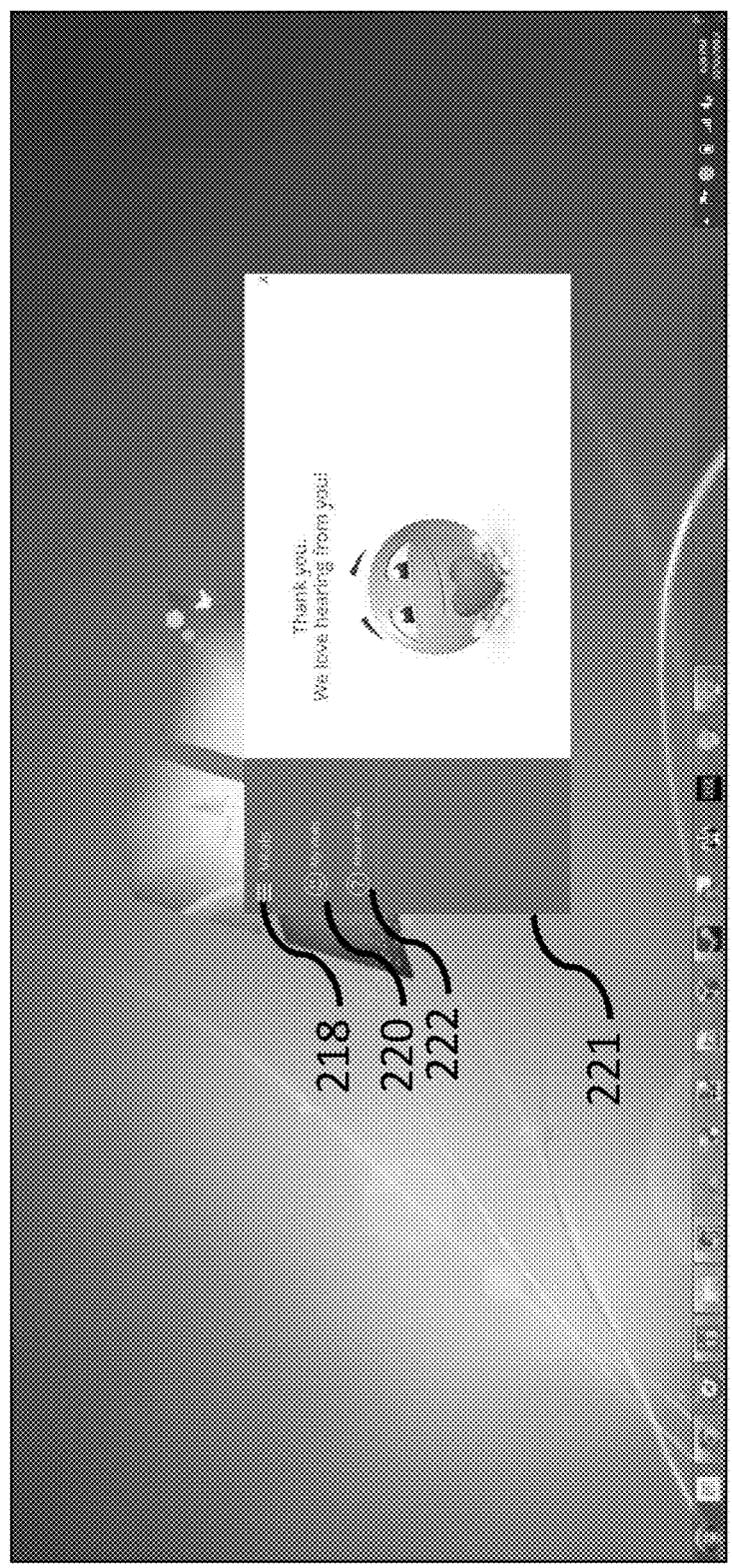

Referring to FIG. 2D, a user selecting menu 218 results in user interface 202 displaying user interface object 221 which is configured to provide a user with menu options. User interface object 221 may include various menu options such as "My Vitals" option 220 and "About Vitals" option 222.

Figure 2E:
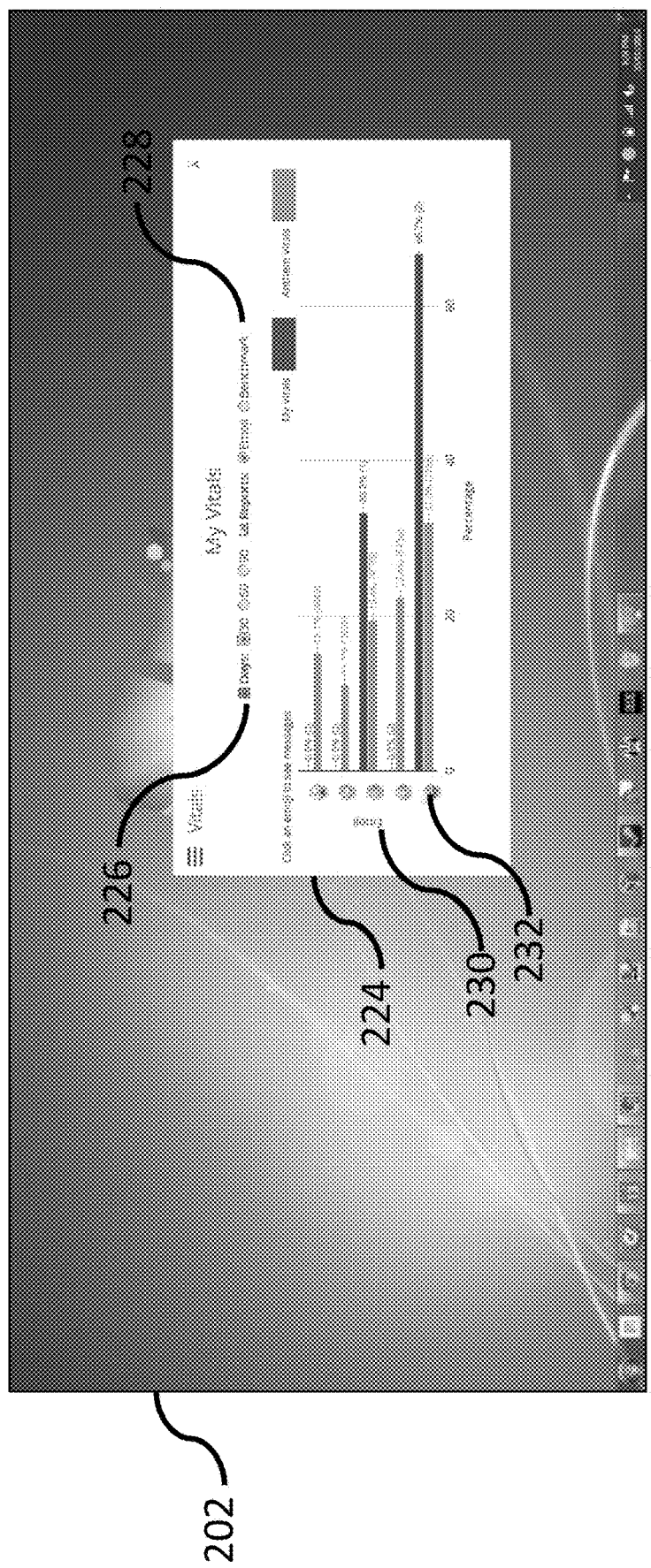

Referring to FIG. 2E, upon selection of "My Vitals" option 220 in FIG. 2D, user interface object 224 may be displayed. In some embodiments, a request for the data displayed in the user interface object 224 may be transmitted to server 108. User interface object 224 may include user-sentiment graph 230, time filter option 226, report display option 228. User-sentiment results graph 230 may aggregate the various sentiment inputs of a specific user and display the various sentiment inputs of a specific user. For example, user-sentiment results graph 230 may aggregate and display various statuses 232 indicative of sentiment inputs of a single user over a specified amount of time. Status 232 may be indicative of various sentiments felt by the user at a specific time. For example, status 232 may be indicative of the user being exhausted, content, happy, excited, etc. In one embodiment, user-sentiment results graph 230 displays statuses 232 of a single user as a percentage of all total possible statuses that have been inputted by the user. For example, user-sentiment results graph 230 may display that a user indicated they were exhausted 15.1% of all total status responses over a specified period of time. In an embodiment, user-sentiment results graph 230 displays all the response for a specific user in one color and all the responses for all users at the same organization in a different color, enabling a user to compare their statuses against other users at the same organization. For example, user-sentiment results graph 230 may indicate that the user was content 33.3% of all total status responses over a specified period of time and that all other employees were content 19.4% of all employee status responses over the same specified period of time. User-sentiment results graph 230 may be updated in real-time to display the current, real-time status of the user compared to the current, real-time statuses of all members or employees of the organization. Time filter option 226 of user interface object 224 may include radio buttons for adjusting the length of time that is shown on user-sentiment results graph 230. For example, as shown in FIG. 2E, time filter option 226 is selected to be 30 days, therefore user-sentiment results graph 230 indicates all the status inputs by the user over a 30-day period. Time filter option 226 may include other options such as 60 days, 90 days, 120 days, 180 days, 1 year, 3 years, 5 years, etc. Report display option 228 of user interface object 224 may include radio buttons for changing the data represented in user-sentiment results graph 230. For example, report display option 228 may include an Emoji report or a benchmark report. Selection of the Emoji report may result in user-sentiment results graph 230 displaying a graph of all statuses 232 as a percentage of all possible status inputs. Selection of the Benchmark report may result in user interface object 224 displaying a graphic representation of the sentiment of a first set of individuals being monitored by the user in comparison to a second set of individuals. A user may select a specific status 232 of user interface object 224 to obtain additional information.

Figure 2F:
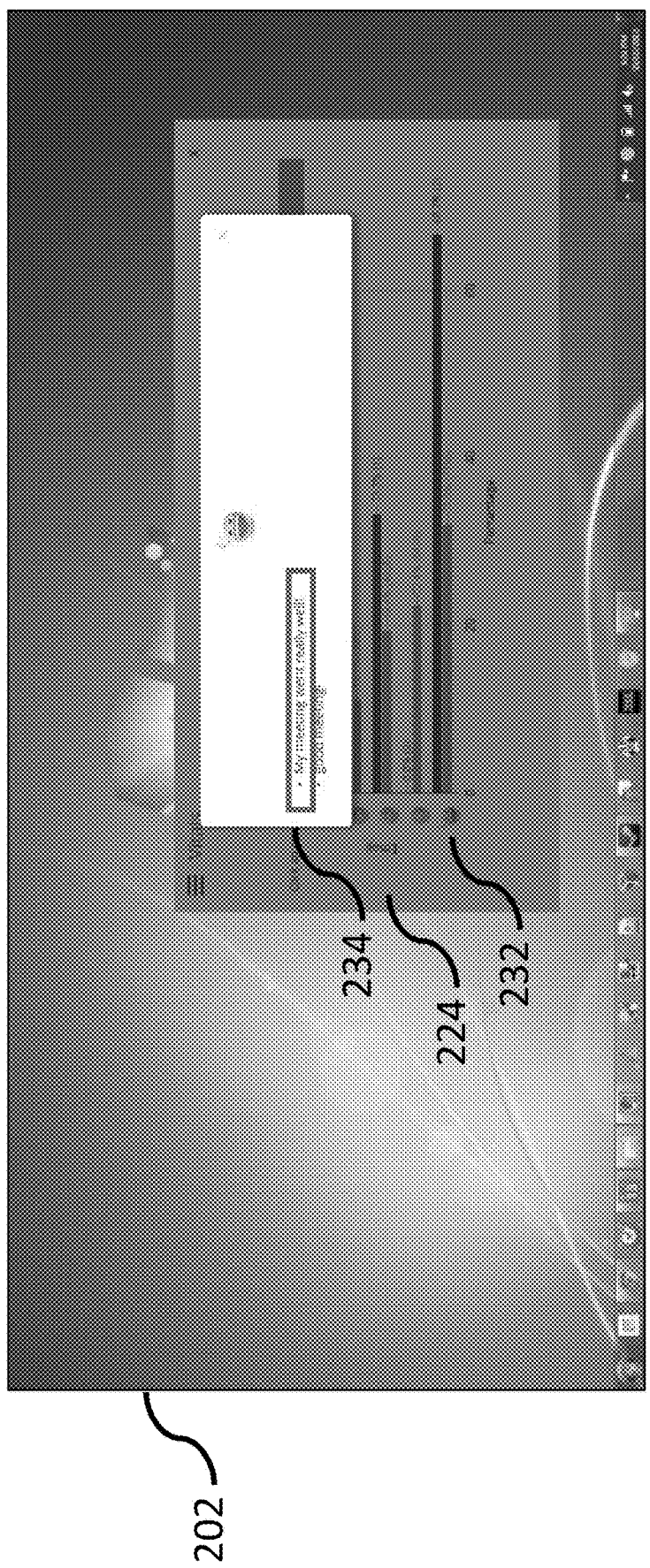

As shown in FIG. 2F, a user may select status 232 resulting in user interface 202 displaying user interface object 234, with user interface object 224 present in the background. User interface object 234 may present the user with specific information regarding status 232. For example, user interface object 234 may present a proposed text input reflective of possible status 232 sentiments. For example, user interface object 234 may present the text input of the reason for their selection of status 232, such as "My meeting went really well!". The text input may have been received by the user inputting the language into a text input box via, for example, a keyboard.

Figure 2G:
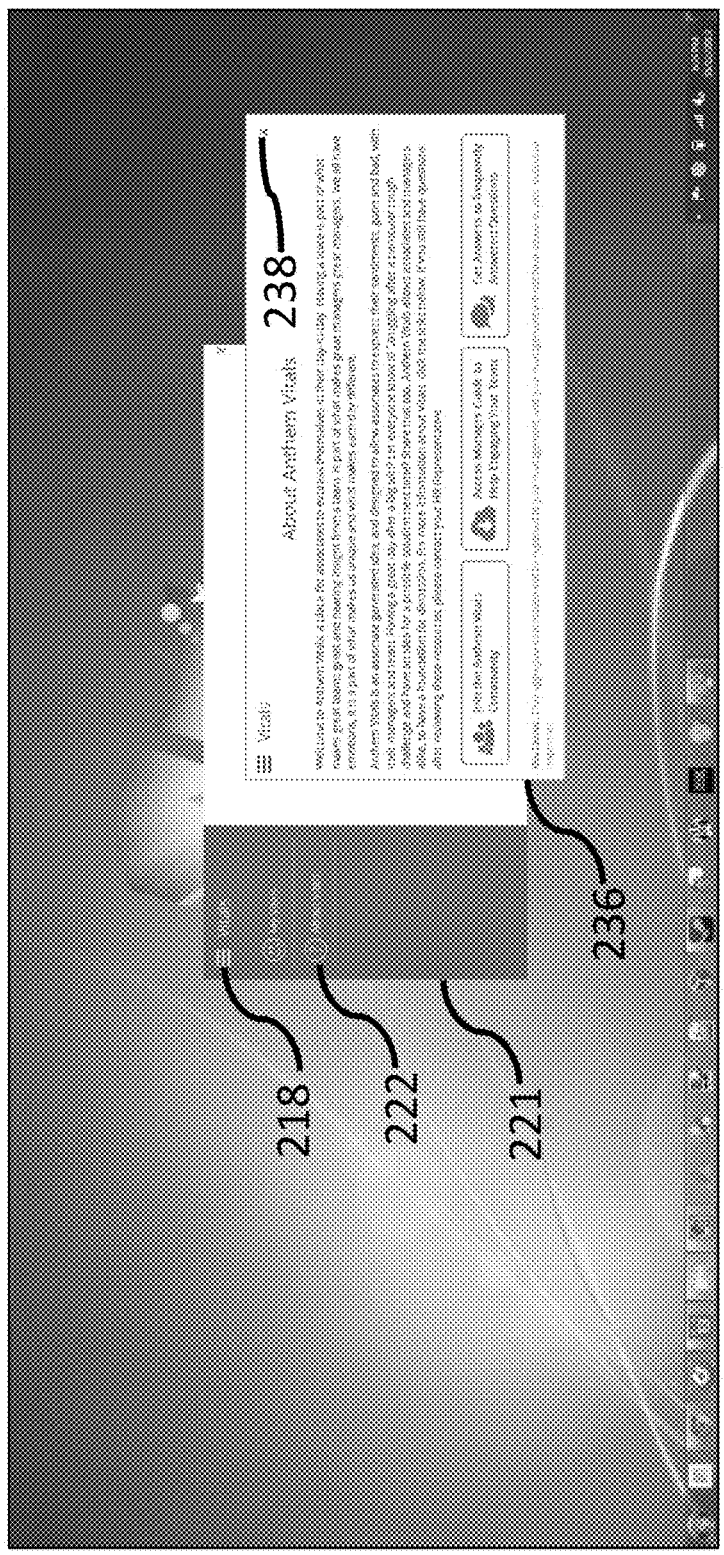
Figure 2H:
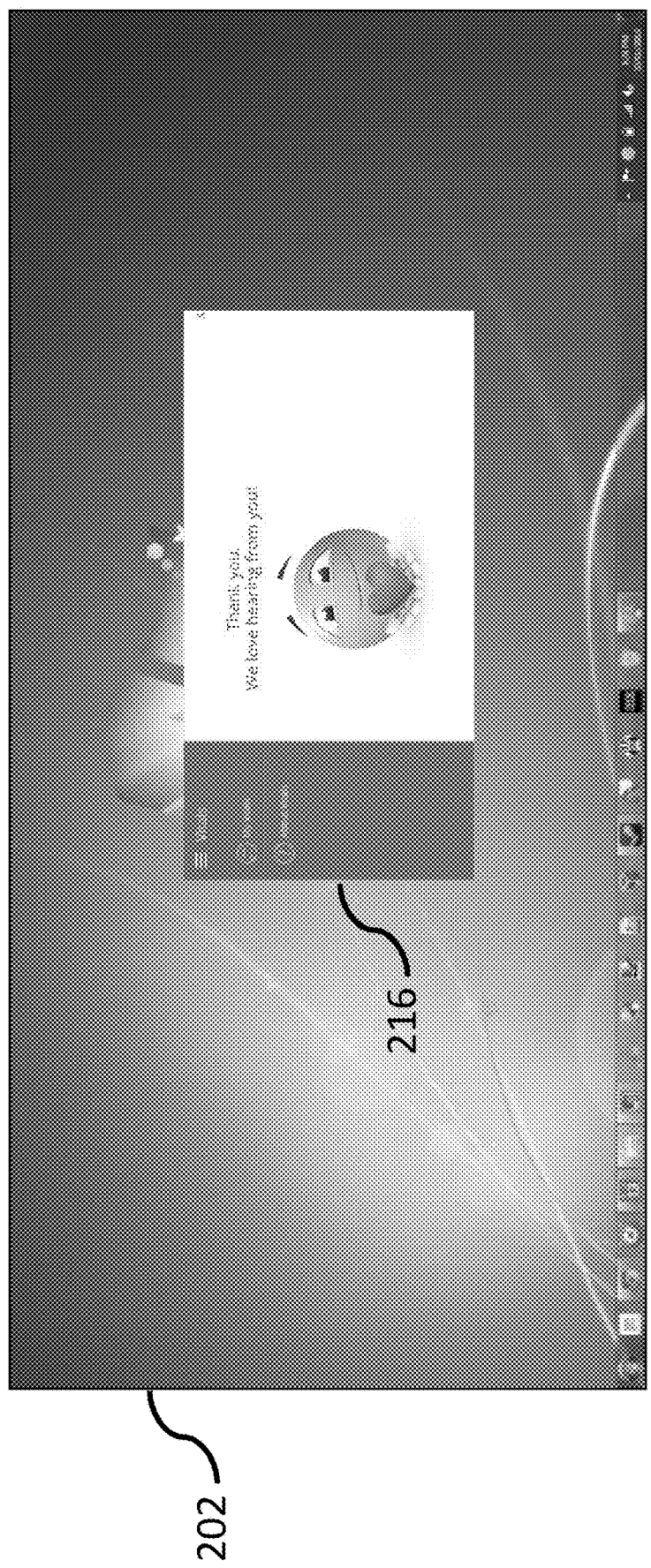
Figure 2I:
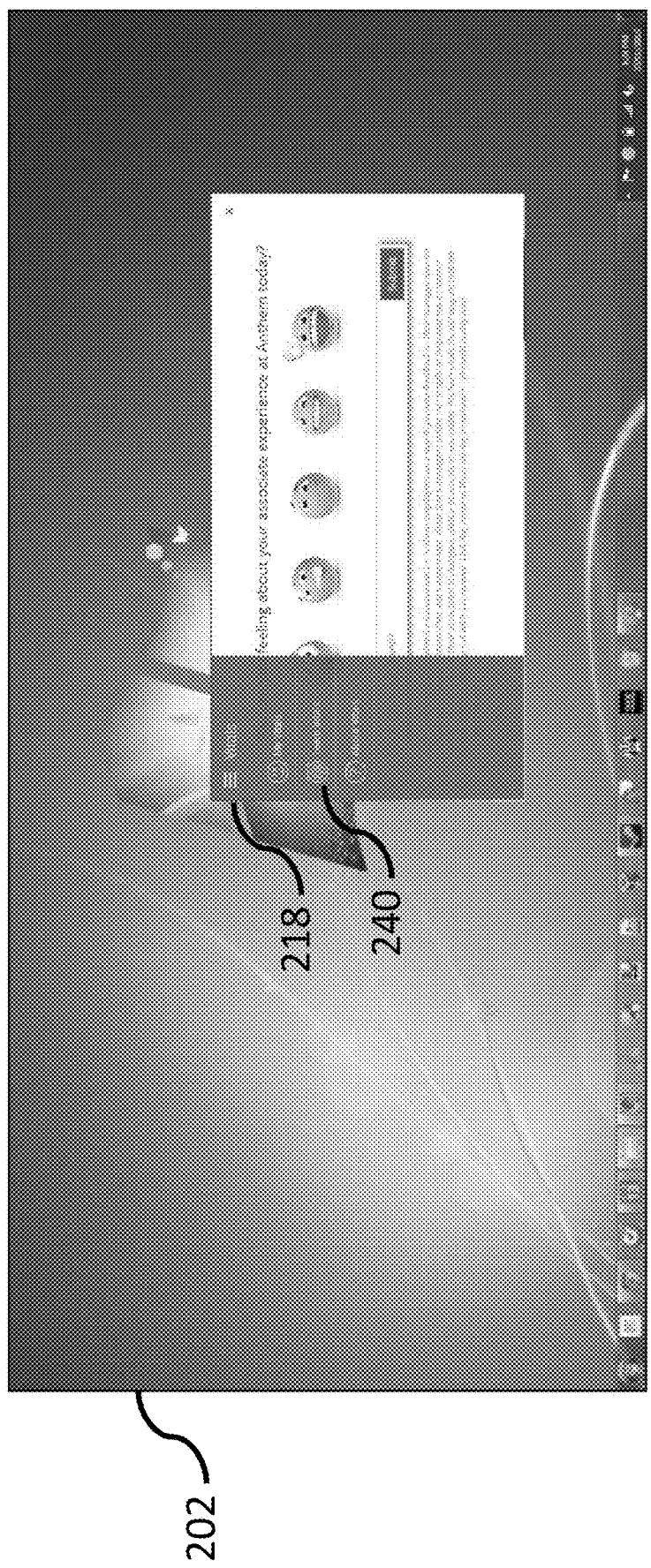

Referring to FIG. 2G, a user may select "About Vitals" option 222 of user interface object 221 (FIG. 2D). Selection of "About Vitals" option 222 may result in user interface 202 displaying user interface object 236. In an embodiment, user interface object 236 may indicate various information regarding the organization to which the user is affiliated (e.g., as a member or employee). For example, user interface object 221 may include detailed information regarding the purpose of collecting the sentiment of the users and contact information. The contact information may include contact information of Human Resource representative or managers. User interface object 221 may further include links to various resources such as technical support, Frequently Asked Questions, support groups, etc.

Figure 2J:
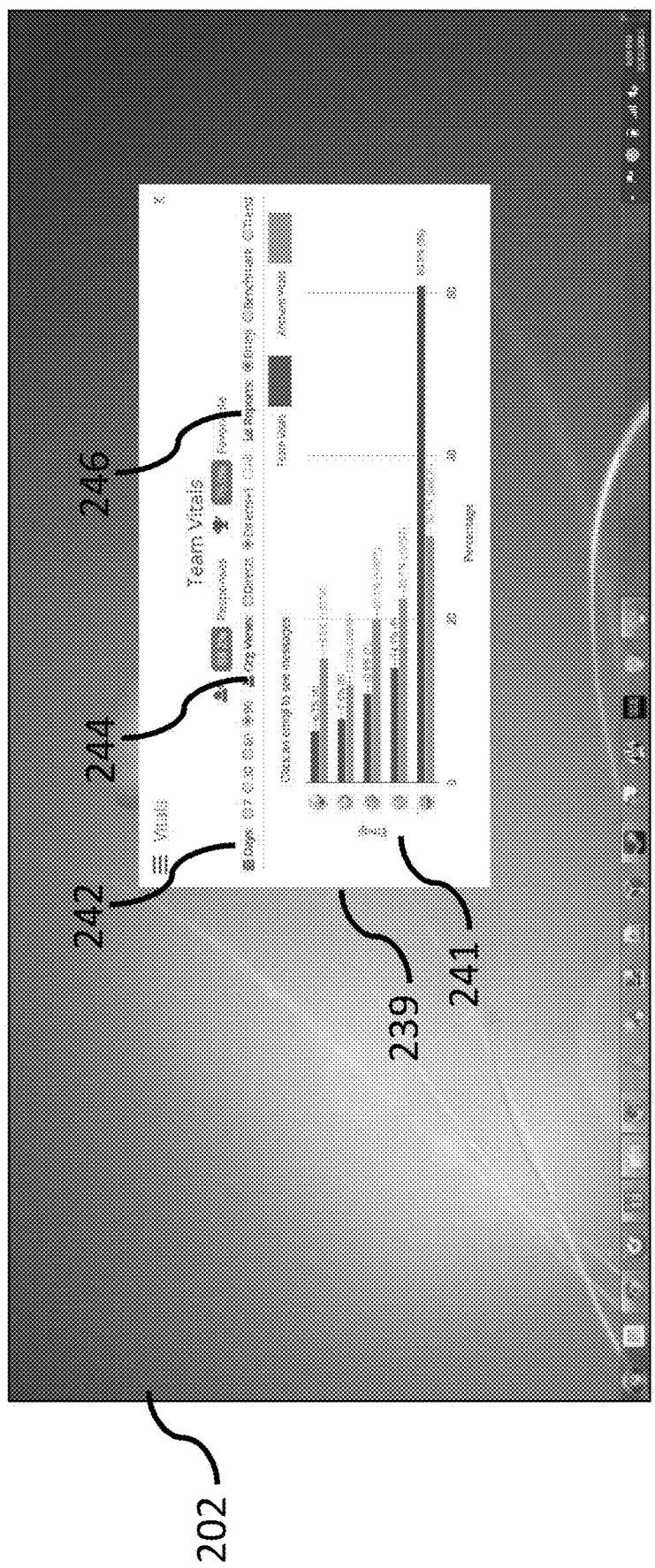

A user may exit user interface 216 by selecting input submission object 238 on FIG. 2G. In one embodiment, the interface 202 displays an exit screen 216, illustrated in FIG. 2H, that signals to the user that portion of the session has terminated Referring to FIG. 2I, user interface 202 may display user interface object 218 which may include "Team Vitals" option 240. "Team Vitals" option 240 may generate status information for all member and employees working under the hierarchy of the user (e.g., direct reports or indirect reports). FIG. 2J shows the result after selecting "Team Vitals" option 240 of FIG. 2I. As shown in FIG. 2J, user interface 202 may display user interface object 239. User interface object 239 may display user-sentiment graph 241 indicating the status of a group that that user is authorized to monitor (e.g., individuals whom the user is supervising). In an embodiment, user-sentiment results graph 241 includes current, real-time statuses of all individuals whom the user is authorized to monitor. As shown in FIG. 2J, user interface object 240 may include time filter option 242, organizational view option 244, and report display option 246. Time filter option 242 of user interface object 240 may include radio buttons for adjusting the length of time that is shown on user-sentiment results graph 241. For example, as shown in FIG. 2J, time filter option 242 is selected to be 90 days, therefore graph 240 indicates all the status inputs for by all individuals whom the user is supervising over a 90-day period. Time filter option 242 may include other options such as 60 days, 90 days, 120 days, 180 days, 1 year, 3 years, 5 years, etc. Organizational view option 244 of user interface object 240 may include radio buttons for changing the organizational view or hierarchy represented in user-sentiment results graph 241. For example, organizational view option 244 may include a view that results in user-sentiment results graph 241 displaying the status of all individuals immediately directly reporting to the user. In another example, organizational view option 244 may include a view that results in user-sentiment results graph 241 displaying the status of all individuals in a pre-selected category of individuals that the user is authorized to monitor (e.g., individuals in the users chain of command such as individuals directly reporting to the user along with any individuals that immediately directly report to those individuals). In yet another example, user-sentiment results graph 241 may include a view that results in user-sentiment results graph 241 displaying the status of every individual at the organization that is a subordinate, either directly or indirectly, to the user. In an embodiment, the status responses submitted by individuals may be anonymous. For example, a user may view the results in user-sentiment results graph 241 however they may not be able to determine which individuals submitted specific statuses. In an embodiment, a user may be able to the view the statuses of individuals who directly or indirectly report to a specific individual.

Figure 2K:
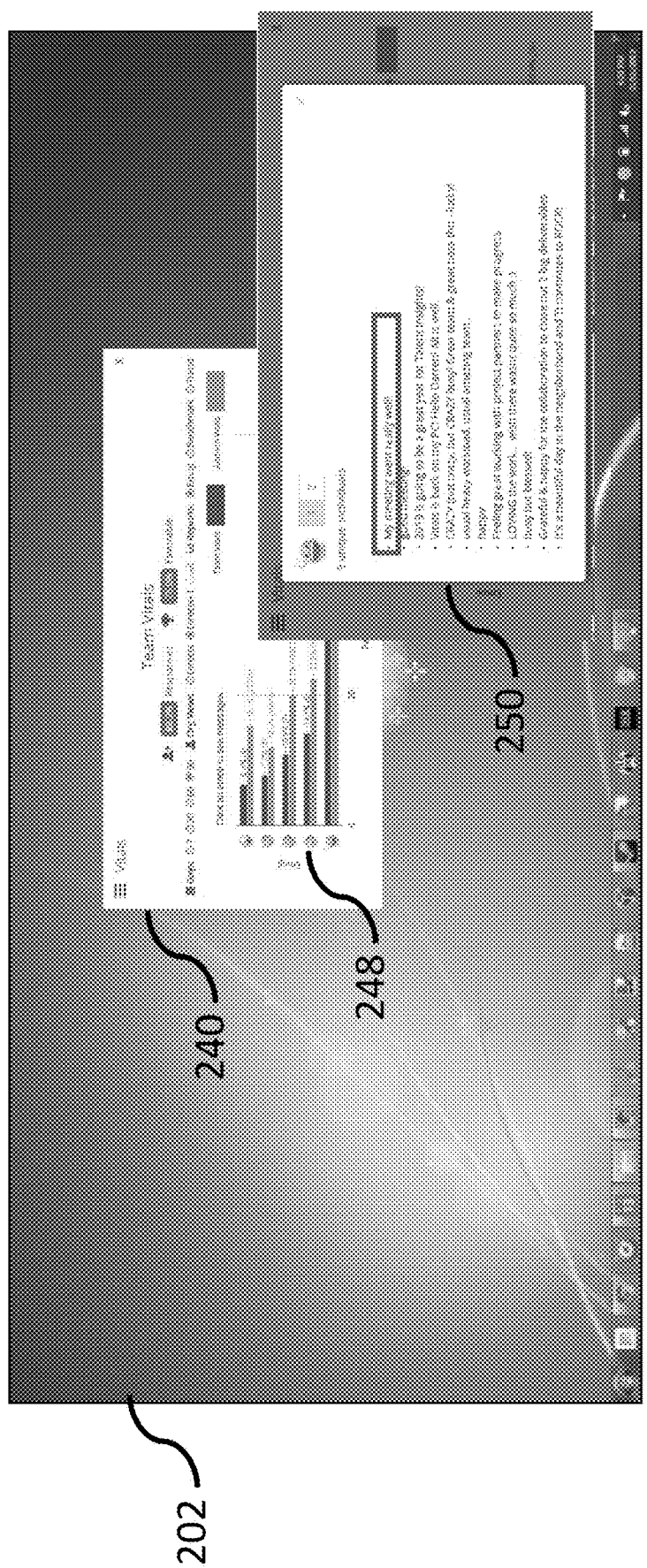

Referring to FIG. 2K, a user may select a specific status or emotion of user interface object 240 to obtain additional status information. As shown in FIG. 2K, a user may select status 248 resulting in user interface 202 displaying user interface object 250, with user interface object 240 present in the background. User interface object 250 may present the user with specific information regarding status 248. For example, user interface object 250 may present all the text inputs submitted by individuals that selected status 248. All the text inputs may be inputs submitted by individuals regarding status 248. These inputs may be transmitted from database 108 via network 105. For example, all text inputs from all individuals indicating a sentiment of status 248 may be stored on database 108 which may be coupled to network 105. All the text inputs indicative of status 248 may be transmitted from database 108 through server 106 and network 105 to first electronic device 102 and second electronic device 104, and may displayed via user interface 202 as user interface object 250.

Figure 2L:
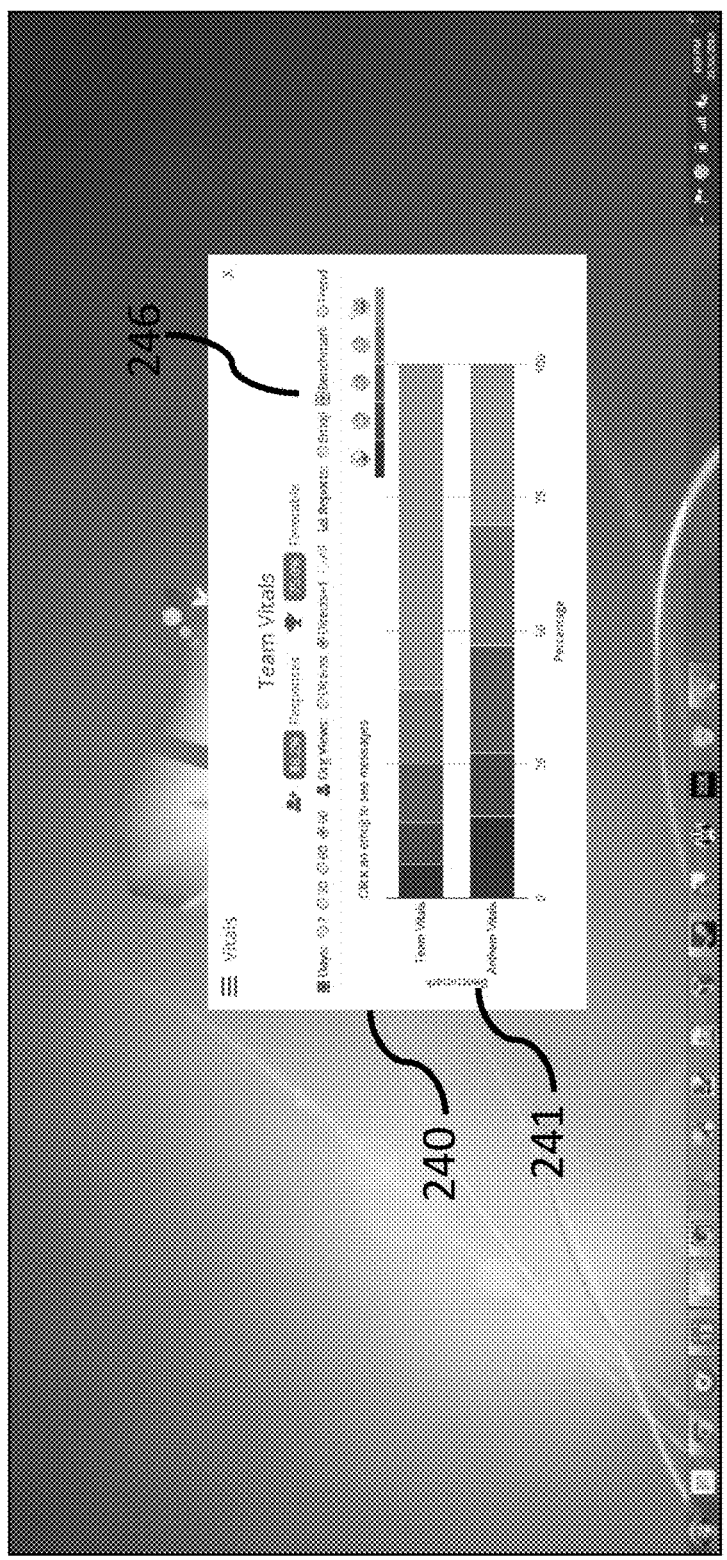
Figure 2M:
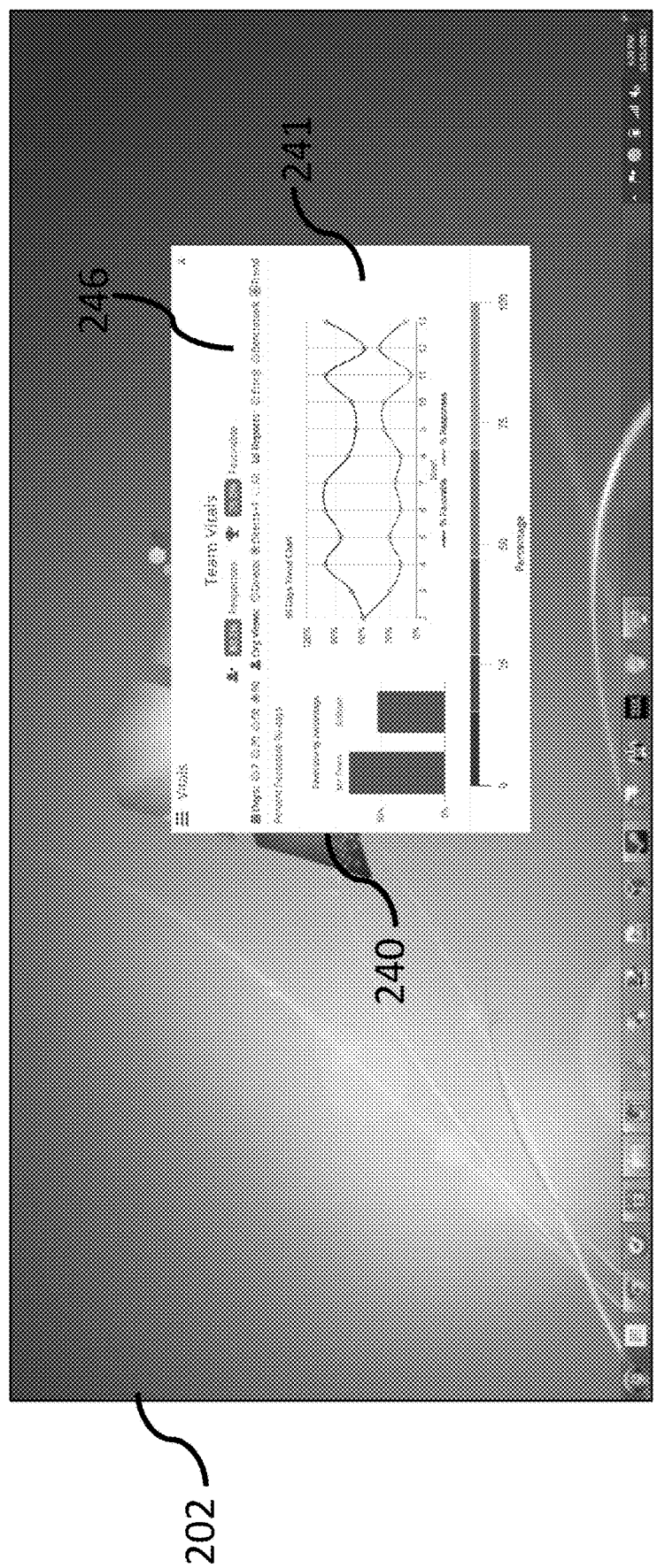

Referring to FIG. 2L, a user may change report display option 246 of user interface object 240 resulting in user interface object 240 changing the presentation of user-sentiment results graph 241. For example, report display option 246 may include various report options such as an Emoji report, a benchmark report, and a trend report. As shown in FIG. 2L, a user may select a benchmark report. Upon user selection of the Benchmark radio button, display 202 may be configured to render interface object 240 as a user-sentiment results graph that displays a graphic representation of the sentiment of a first set of individuals being monitored by the user in comparison to a second set of individuals (e.g., a comparison of users direct reports to all users in an organization). In user-sentiment results graph 241 illustrated in FIG. 2L, each of the user sentiments are displayed as an accumulation of percentages totaling 100%. User-sentiment results graph 241 allows a user to quickly discern overall sentiment of a group relative to an organization. User-sentiment results graph 241 may be used by a manager to discern what sentiment a majority of their team is feeling at a specific time. This allows a manager to assess the sentiment of their team in the aggregate to determine the overall morale of the team. For example, user interface object 240 may allow a manager to quickly view user-sentiment graph 241 to determine the overall sentiment of their team and if any actions needed to be taken. FIG. 2M illustrates a trend report. The trend report of FIG. 2M is displayed in response to a user selecting the Trend radio button in FIG. 2L. In one embodiment, selection of the Trend radio button causes display 202 to transition user-sentiment results graph 241 to present information regarding trends of statuses of individuals over specified periods of time. Time filter option 242, organizational view option 244, and report display option 246 of user interface object 240 may be changed to alter the information presented in user-sentiment results graph 241.

User interfaces of FIGS. 3A-3D illustrate exemplary methods of notifying users and allowing user to communicate with other users in the organization.

Figure 3A:
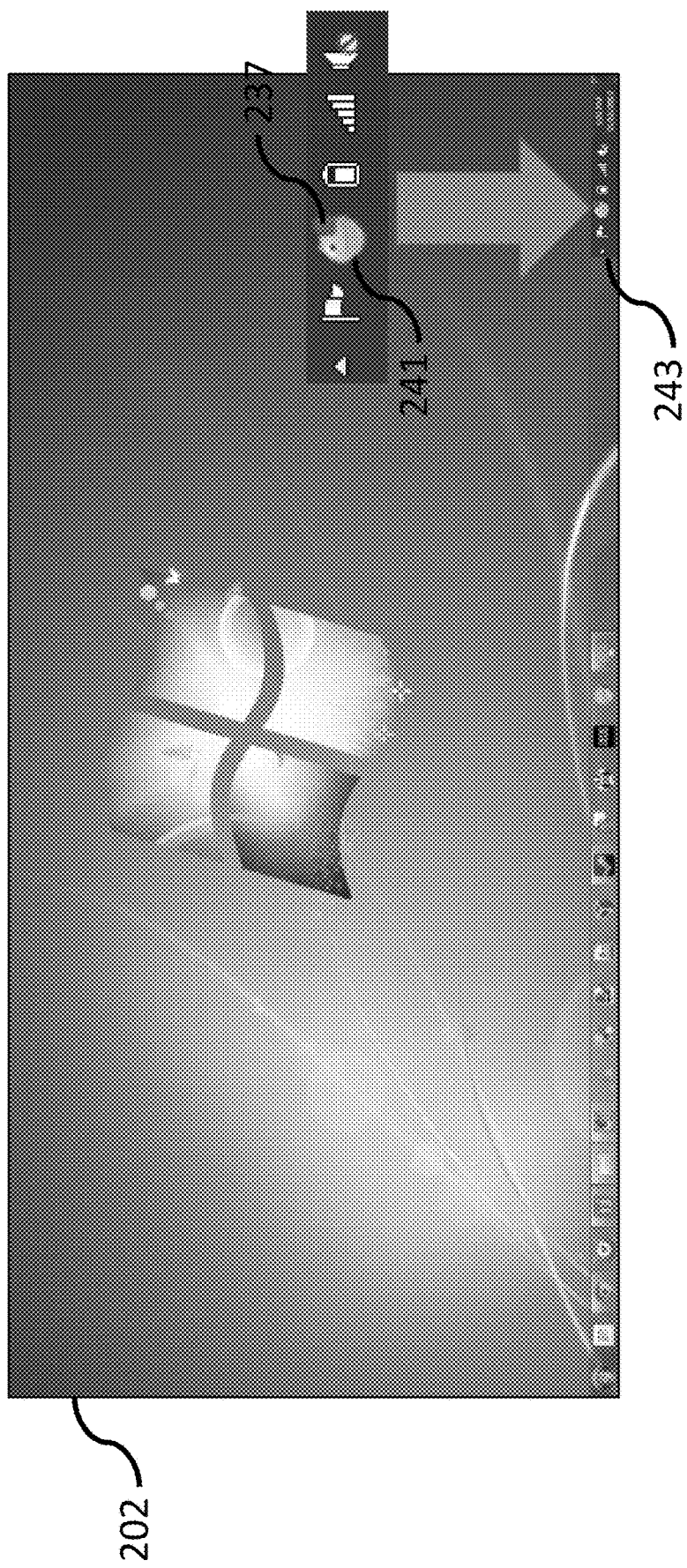

Referring to FIG. 3A, user interface 202 may display system tray 243 having system tray icon 241. System tray icon 241 may include a notification element 237. Notification element 237 may provide a visual indication to a user that an unread message has been received and is available to be viewed.

Figure 3B:
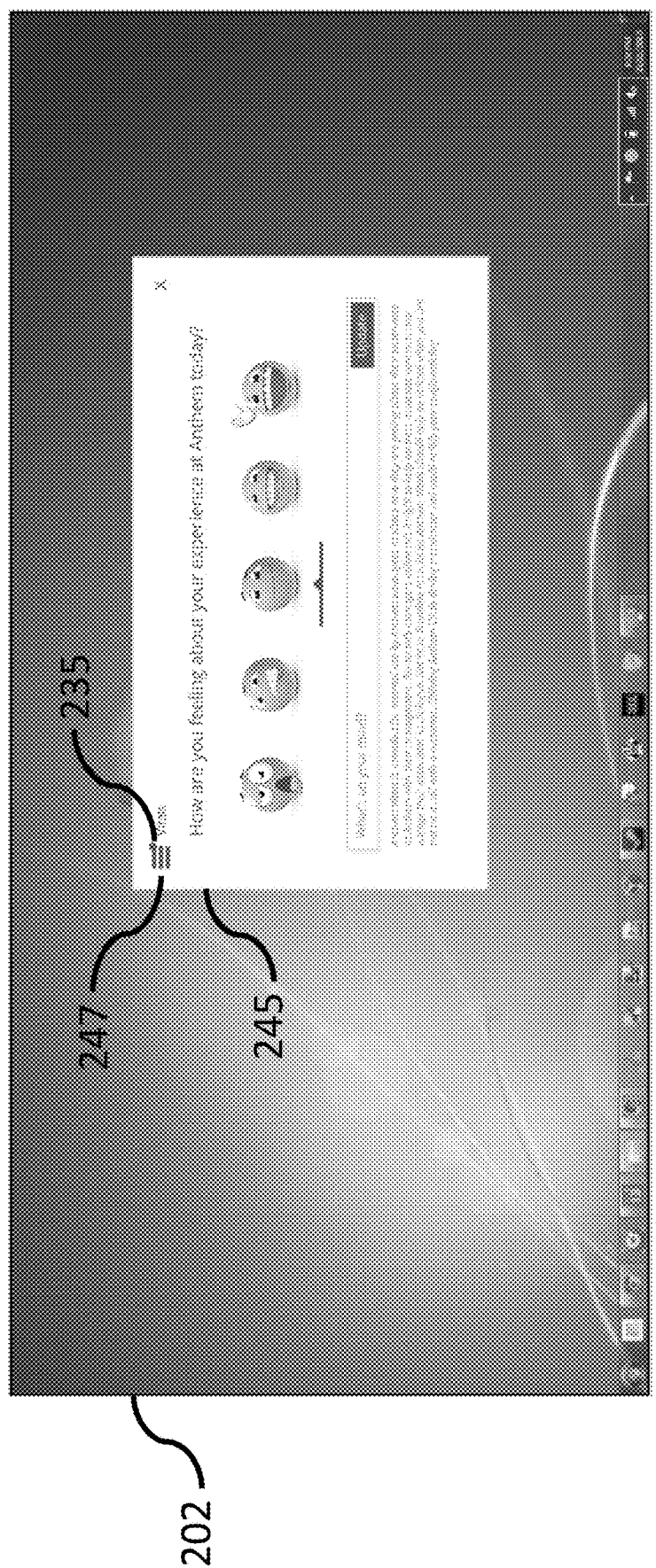

Referring to FIG. 3B, a user may select system tray icon 241 resulting in user interface 202 displaying user interface objet 245. User interface object 245 may include menu 247, which may include notification element 235 indicating to the user that an unread message is available to be viewed.

Figure 3C:
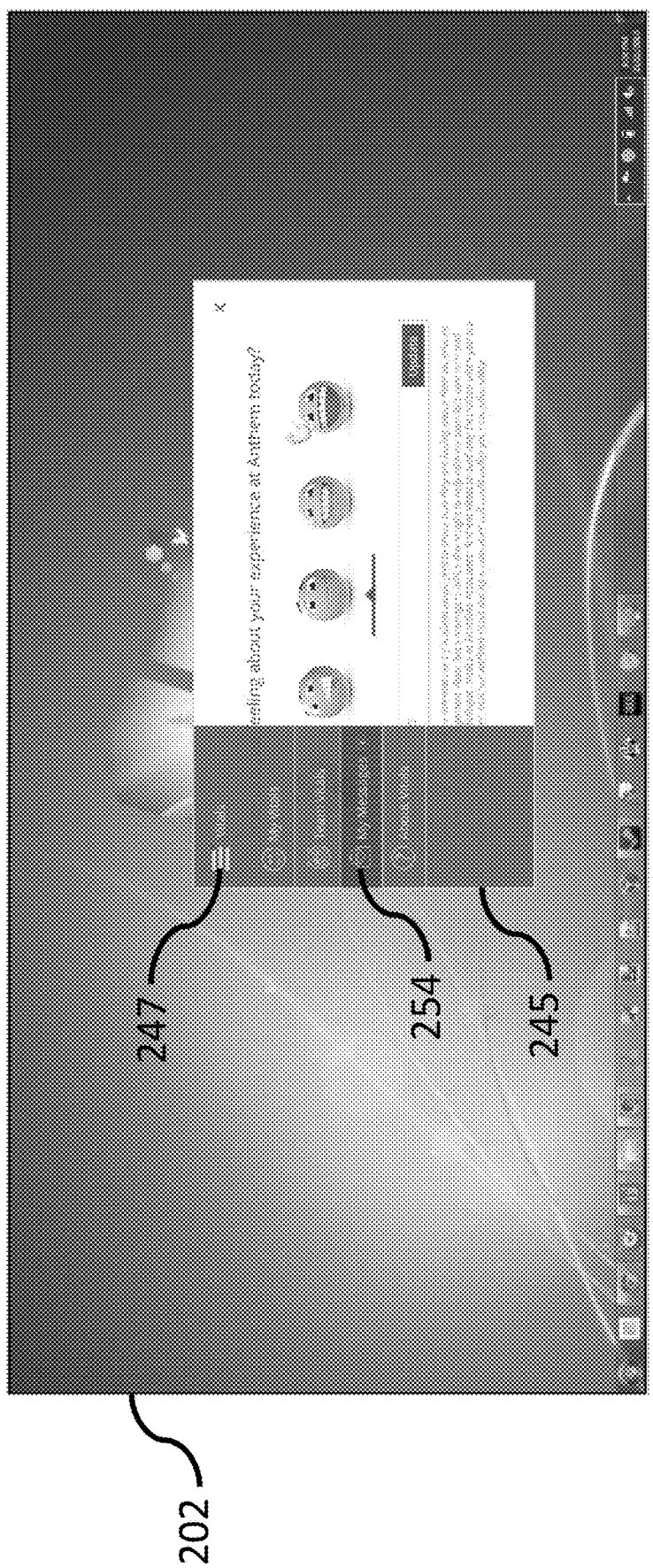

Referring to FIG. 3C, menu 247 may include "My Messages" option 254. The "My Messages" option 254, when selected, provides messages available to the user.

Figure 3D:
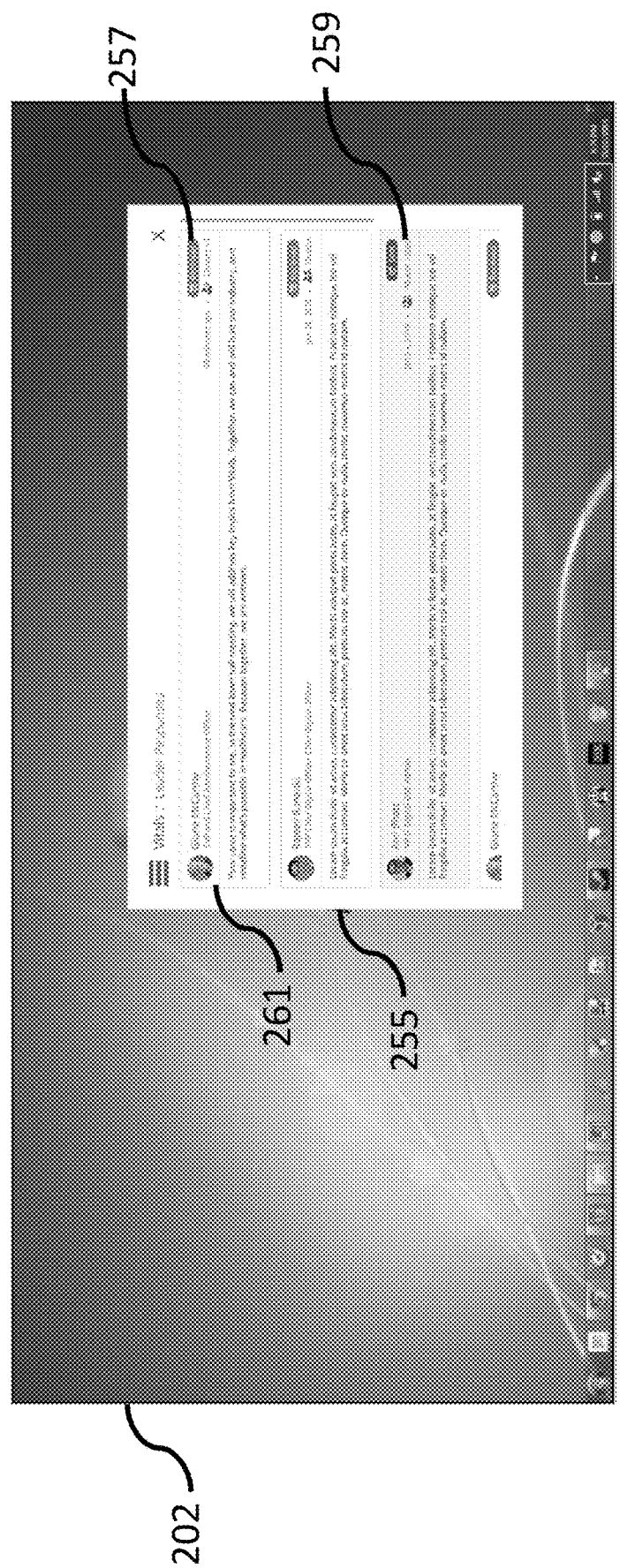

As shown in FIG. 3D, in response to selection of the "My Messages" option 254 in FIG. 3C, user interface 202 may display user interface object 255 providing messages available to the user. User interface object 255 may display one or more messages 261. Each of the messages 261 may include status indicator 255 and group indicator 259. Status indicator 255 may indicate to the user the status of each message 261. For example, status indicator 255 may indicate to the user that message 261 is unread, has been sent, has been received, has been deleted, has been archived, or has been unsent. Group indicator 259 may indicate to the user the group or position to which the sender of message 261 belongs. For example, group indicator 259 may indicate a relative position in an organization hierarchy of the sender and the user. For example, group indicator 259 may reflect a relative position of the sender being subordinate in an organization. Group indicator 259 may also reflect a relative position of the sender being a member of a specific group within the organization, such as "all associates," "all managers," "all executes," "all support staff," etc.

Figure 4A:
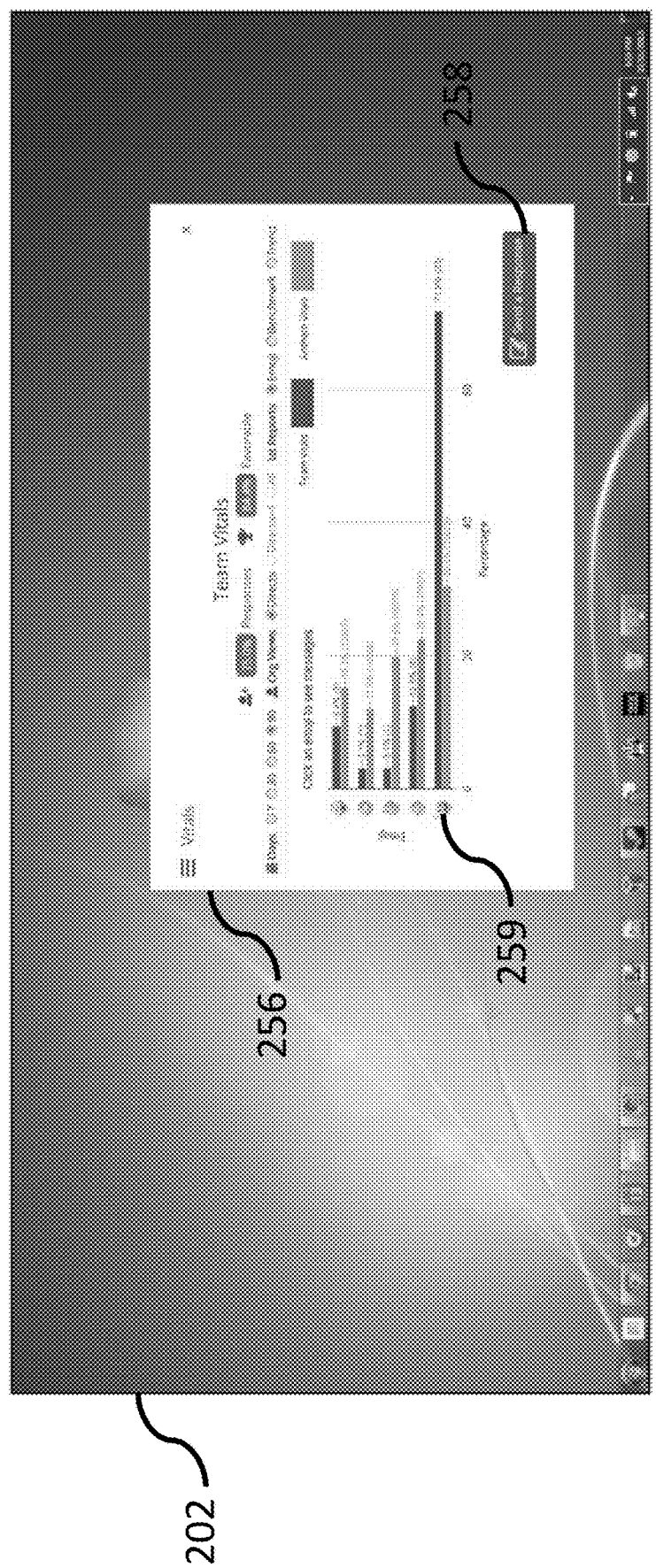
Figure 4B:
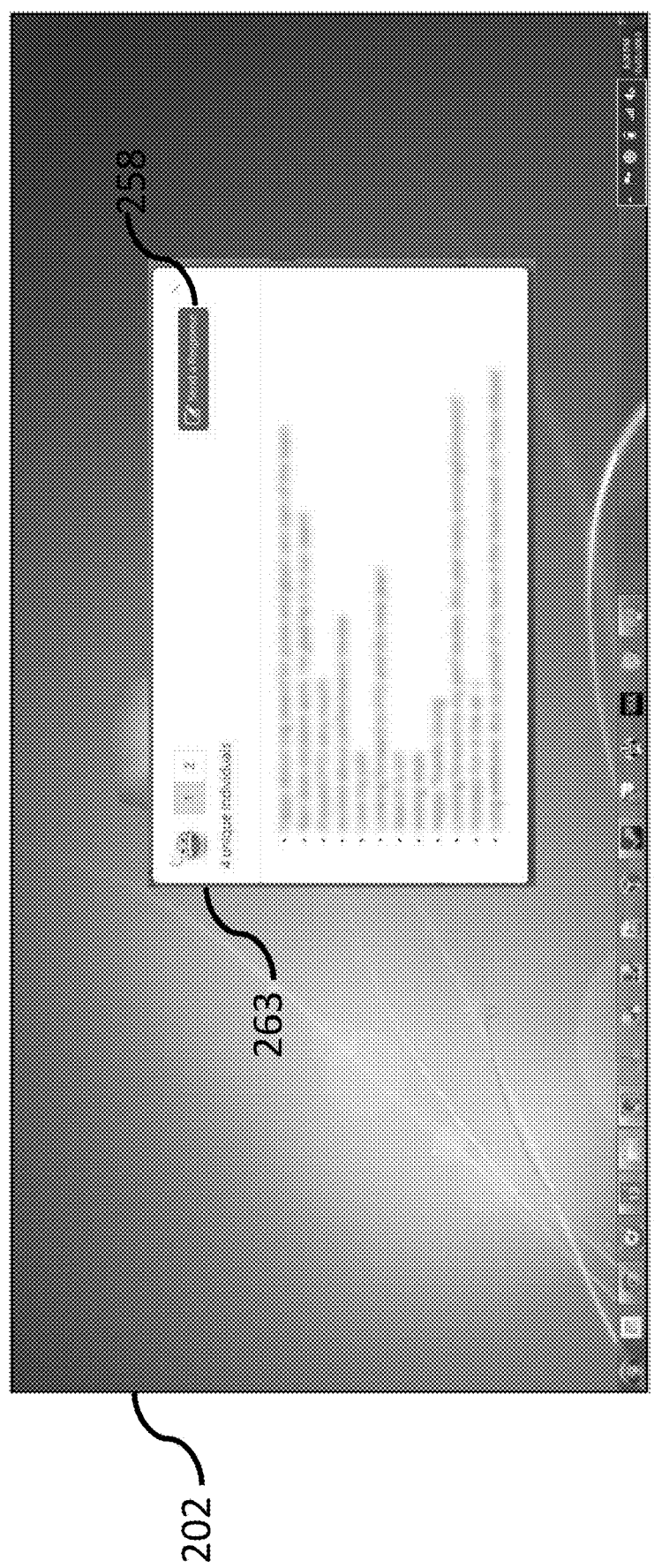
Figure 4C:
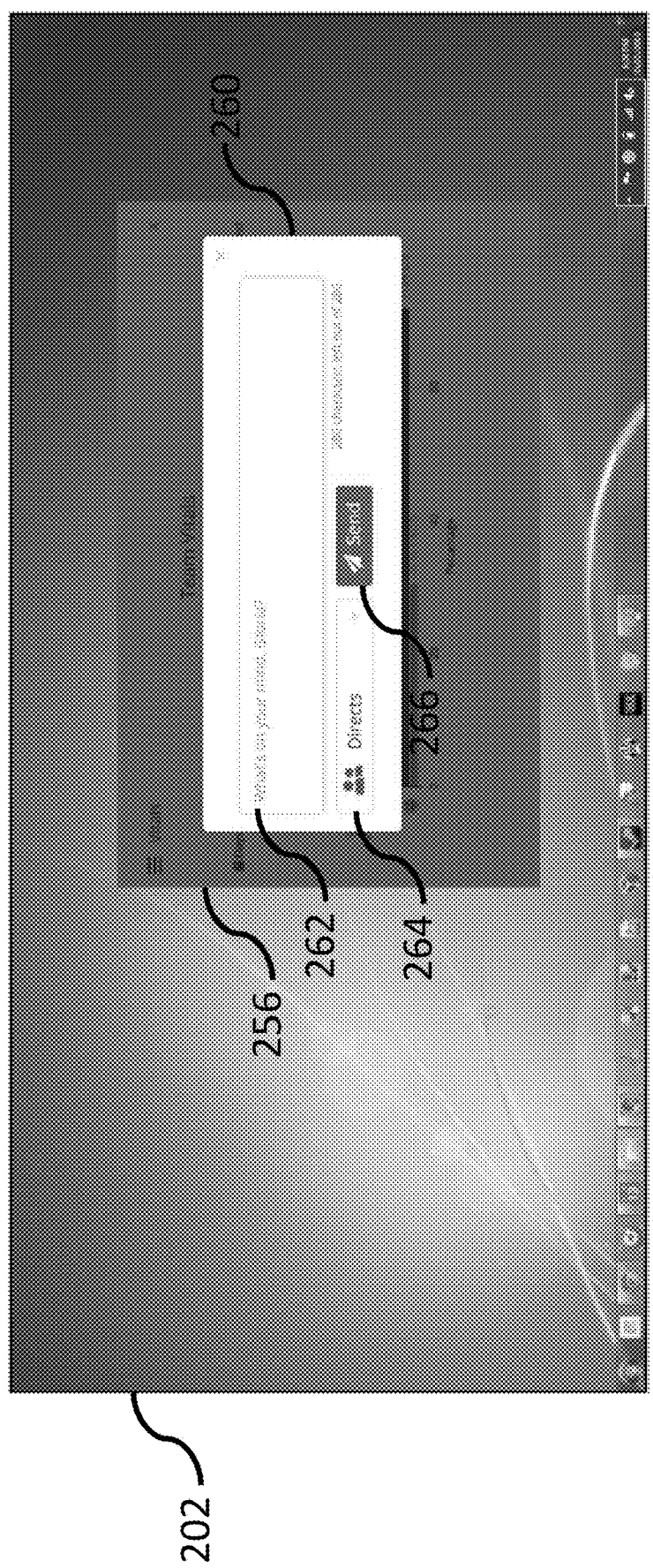

User interfaces of FIGS. 4A-4C illustrate exemplary methods of sending a message or response to users within an organization from the "Team Vitals" user interface object 256 (and also shown in a different embodiment in FIG. 2J, for example).

Referring to FIG. 4A, user interface 202 may display user interface object 256 which may include response submission input 258. Response submission input 258 may allow a user to send a message to other users within the same organization. User interface object 256 may include status 259 which may be selected by a user.

Selection of status 259 of FIG. 4A may result in user interface 202 displaying user interface object 263 illustrated in FIG. 4B. User interface object 263 of FIG. 4B displays all the text inputs from individuals who selected the status 259. User interface object 263 may also include response submission input 258 allowing a user to send a message to others within the same organization from user interface object 263.

Upon selection of response submission input 258 from either user interface object 256 (FIG. 4A) or user interface object 263 (FIG. 4B), user interface object 260 (FIG. 4C) may be displayed. User interface object 260 may overlay user interface object 256. User interface object 260 may include user input field 262, recipient group 264, and input submission object 266. User input field 262 may be configured to allow a user to input characters to construct a message. The message may be sent by a manager to a specific member of their team or to all members of their team. A manager may send a message to a specific member regarding the real-time user-sentiment status indicated by the member. For example, a manager may receive real-time information that a specific member has just indicated a user-sentiment of being exhausted or unhappy. The manager may send a message to the specific member asking the reason why they are feeling exhausted or unhappy. In another example, a manager may determine that a majority of their team has in real-time indicated a user-sentiment of exhausted. The manager may send a message to the entire team stating that the project is almost over or incentives to get through the project. Recipient group 264 may be configured to provide various groups within the organization for the user to send a message to. The groups may be based on predetermined characteristics such as job title, hierarchal organization, or seniority level. Input submission object 266 may be selected by the user to send the message constructed in user input field 262 to all recipients in the group designed in recipient group 264.

Figure 5A:
FIG. 5A illustrates an exemplary flow chart representing a method for assessing sentiment of a group or organization of people in accordance with an exemplary embodiment of the present invention.

FIGS. 5A-5B illustrate a flow diagram of an exemplary method 300 of the present invention. Method 300 may include step 302 of authenticating a user of first electronic device 102. Method 300 may include authenticating a user of first electronic device 102 to connect to a network, where the user is a member of an organization, and generating user credentials indicative of the user to access resources on the network. For example, as shown in FIG. 2A, method 300 may allow a user via authentication of user credentials to access user interface 202. The user credentials may include one or more employees, such as junior employees, that are the responsibility of the user, a manager of the user, or an organizational role of the user, such as manager, supervisor, executive, associate, etc. The user credentials may also include location, age, sex, or ethnicity of the user. Authenticating a user on first electronic device 102 allows first electronic device 102 to associate that user with certain characteristics on the network. Method 300 may include step 304 of displaying a system tray icon on a home screen of first electronic device 102. For example, as shown in FIG. 2A, upon authenticating the user on first electronic device 102, user interface 202 may be displayed which may include system tray 204 which may include a system tray icon 206. In step 306, method 300 may detect a first input from the user. The first input may be indicative of a selection of system tray icon 206 resulting in user interface 202 of first electronic device 102 displaying user interface object 208. For example, as shown in FIGS. 2A-2B, user interface 202 may detect a first input by the user which may be indicative of the selection of system tray icon 206. Step 308 of method 300 may include displaying a user interface including a status submission user interface having a plurality of user-sentiment icons upon detecting the first input. For example, in response to the first input, user interface 202 may display user interface object 208 which may be overlaid on the user interface 202. As shown in FIG. 2B, user interface object 208 may be a status submission user interface which may include input field 210 such as a text input box, configured to receive a user-sentiment text input from the user indicative of user sentiment of the user. The status submission user interface may include plurality of user-sentiment icons 214. Plurality of user-sentiment icons 214 may correspond to a numerical value on a numerical value scale indicative of the sentiment and status of the user. Method 300 may include step 310 of detecting a second input indicative of the selection of one of the user-sentiment icons and step 312 of transmitting the selection of the one of the user-sentiment icons to a server device. For example, as shown in FIGS. 2B-2C, after detecting a second input indicative of a selection of one of plurality of user-sentiment icons 214, the status indicative of the user credentials may be transmitted to server 106, along with a time when the second input occurred, and the numerical value data associated with the user-sentiment icon selected by the user from plurality of user-sentiment icons 214.

Referring to FIG. 5B, method 300 may further include step 314 of detecting a third input indicative of a selection to display reporting data. The third input may be indicative of a selection to display reporting data. The third input may be detected while displaying the status submission user interface, such as user interface object 221. For example, as shown in FIG. 2D, user interface object 221 may display menu 218 which may display "My Vitals" option 220. A third input may be detected based on the selection of "My Vitals" option 220. Step 316 of method 300 may include requesting reporting data from server 106. As shown in FIGS. 2D-2E, selection of "My Vitals" option 220 results in a request from second electronic device 104 for reporting data. This may include reporting data for one or more users in the organization. The reporting data for the one or more users may be a function of the user credentials indicative of the user to access resources on the network. The reporting data for the one or more users may be indicative of the user requesting the reporting data, or one or more employees that are the responsibility of the user. The reporting data may include a count of a number of instances where a respective user-sentiment icon of a plurality of user-sentiment icons was previously selected by the one or more users and/or a percentage of the number of instances where the respective user-sentiment icon was previously selected by the one or more users relative to the other user-sentiment icons. In an embodiment, while displaying a reporting user interface including the reporting data for one or more users in the organization, displaying a messaging object, and in response to a selection of the messaging object, displaying a messaging user interface including a text input field, an organizational group selection object and a message submission object. For example, as shown in FIG. 4A, messaging object 258 is displayed at the user interface object 256.

Step 320 of method 300 may include detecting a fourth input indicative of a request to filter the reporting data. The fourth input may filter the reporting data displayed on the reporting user interface to within a period of time. The reporting data may be filtered based on data collected over a predetermined time, data compared to other users, data compared to all users, trends, or user-sentiment icons selected. For example, as shown in FIG. 2E, user interface object 224 may include time filter option 226 and report display option 228. Time filter option 226 and report display option 228 may filter the data presented on user-sentiment results graph 230. By implementing a system where a user can provide user sentiment status updates to an organization in real-time, while also allowing a manager to view and filter results, in real-time, provides organizations with real-time data about the health and wellbeing of employees.

In an embodiment, a fifth input may be detected. The fifth input may be indicative of a request to filter the reporting data displayed on the reporting user interface to a subset, less than all, of the one or more employees that are the responsibility of the user. For example, organizational view option 244 shown in FIG. 2J, when selected, causes the device to filter the reporting data displayed on the user interface object 239. In an embodiment, a sixth input may be detected. The sixth input may be indicative of a request to display one or more user-sentiment text inputs provided by one or more employees that are the responsibility of the user. In an embodiment, a seventh input may be detected. For example, as shown in FIG. 2K, in response to selection of status 248, user interface object 240 which displays status information provided by users that selected status 248 may be displayed. he seventh input may be indicative of a request to display on the reporting user interface reporting data for a subset, less than all, of the one or more employees that are the responsibility of the user concurrently with reporting data for all of the employees of the organization. For example, as shown in FIG. 2J, user-sentiment results graph 241 may include current, real-time statuses of all individuals whom the user is supervising. In an embodiment, an eighth input may be detected. The eighth input may be indicative of a request to display, on the reporting user interface reporting data for the one or more employees that are the responsibility of the user at one or more time instances over a time period. For example, as shown in FIG. 2M, user-sentiment results graph 241 may be configured to present information regarding trends of statuses of individuals over specified periods of time.

In an embodiment, first users may be authenticated on first electronic device 102. The first users may be members of an organization. First electronic device 102 and second electronic device 104 may be configured to render a display that includes a status submission user interface having a plurality of user-sentiment icons. First electronic device 102 may render a display that includes a status submission user interface having a plurality of user-sentiment icons. First electronic device 102 may detect a selection of one of the user-sentiment icons, and transmit to server 106 status data associated with the authenticated first users of first electronic device 102 and the detected selection of the user-sentiment icons to server 106. Second electronic device 104 may authenticate a second user. The second user may be a member of the organization. Server 106 may receive instructions associated with second electronic device 104 to render on the display of second electronic device 104, reporting data associated with the status data. In an embodiment, the reporting data includes an indication of a number of times each one of plurality of user-sentiment icons was selected by the first users based upon the first users' position in the organization, and rendering, on the display of the second electronic device, the reporting data, without receiving additional instructions to render the display on second electronic device 104, updating the reporting data displayed on second electronic device 104 to reflect status data transmitted to server 106 after the receiving at server 106 of instructions associated with second electronic device 104 to render on the display of second electronic device 104 the reporting data.

In an embodiment, the reporting data rendered on the display of second electronic device 104 may be rendered as an active user interface that is selectable to display further information about the reporting data.

In an embodiment, the status submission user interface may be configured to receive text input from the respective first user and the further information about the reporting data includes at least a portion of the text input.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

We claim:

1. A method, comprising:
    at a first electronic device including a user-input device and a display:
        authenticating a user of the first electronic device,
        in response to authenticating the user, generating user credentials indicative of authorization of the user to access a network;
        displaying a home screen on the display, the home screen including a system tray, the system tray including a system tray icon;
        detecting a first input indicative of a selection of the system tray icon on the system tray;
        in response to detecting the first input indicative of the selection of the system tray icon, displaying a status submission user interface overlaid on the home screen, the status submission user interface including a plurality of user-sentiment icons;
        after detecting a second input indicative of a selection of one of the user-sentiment icons, transmitting, to a server device, status data associated with the user credentials, a time when the second input was detected, and user-sentiment data associated with the selected user-sentiment icon;
        while displaying the status submission user interface, detecting a third input indicative of a selection to display reporting data, the reporting data including:
            a count of a number of instances where a respective user-sentiment icon of a plurality of user-sentiment icons was previously selected by one or more users, and
            a percentage of the number of instances where the respective user-sentiment icon was previously selected by the one or more users relative to other user-sentiment icons;
        in response to detecting the third input indicative of a selection to display reporting data:
            requesting reporting data from the server device;
            comparing in real-time the percentage of the number of instances of one or more users with a percentage of a number of instances of one or more other users to generate a sentiment comparison; and
            receiving and displaying a reporting user interface, the reporting user interface including the reporting data for one or more users in an organization and the sentiment comparison displayed as a percentage change over a predetermined period of time.

2. The method of claim 1, wherein the reporting data for one or more users is a function of the user credentials of the user.

3. The method of claim 2, wherein the user credentials include credentials of at least one of: one or more employees that are the responsibility of the user, a manager of the user, and an organizational role of the user.

4. The method of claim 2, wherein the user credentials include at least one of: location, age, sex, and ethnicity.

5. The method of claim 2, wherein the reporting data for one or more users is generated for at least one of: the user requesting the reporting data, and one or more employees that are the responsibility of the user.

6. The method of claim 1, wherein the status submission user interface includes a text input field configured to receive a user-sentiment text input indicative of user sentiment of the user.

7. The method of claim 6, further comprising:
    while displaying a reporting user interface including the reporting data for one or more users in the organization, receiving a fourth input to filter the reporting data displayed on the reporting user interface to within a time period.

8. The method of claim 7, further comprising:
    while displaying the reporting user interface including the reporting data for one or more users in the organization, receiving a fifth input to filter the reporting data displayed on the reporting user interface to a subset, less than all, of the one or more employees that are the responsibility of the user.

9. The method of claim 8, further comprising:
    while displaying the reporting user interface including the reporting data for one or more users in the organization, receiving a sixth input to display one or more user-sentiment text inputs provided by one or more employees that are the responsibility of the user.

10. The method of claim 9, further comprising:
    while displaying the reporting user interface including the reporting data for one or more users in the organization, receiving a seventh input to display, on the reporting user interface reporting data for a subset, less than all, of the one or more employees that are the responsibility of the user concurrently with reporting data for all of the employees of the organization.

11. The method of claim 10, further comprising:
    while displaying the reporting user interface including the reporting data for one or more users in the organization, receiving an eighth input to display, on the reporting user interface reporting data for the one or more employees that are the responsibility of the user at one or more time instances over a time period.

12. The method of claim 11, further comprising:
    while displaying a reporting user interface including the reporting data for one or more users in the organization, displaying a messaging object; and
    in response to a selection of the messaging object, displaying a messaging user interface including a text input field, an organizational group selection object and a message submission object.

13. The method of claim 12, further comprising:
    while using the messaging user interface, transmitting a message to one or more users in the organization, the message associated with the selection of the user-sentiment icons.

14. The method of claim 13, wherein the one or more users is a subordinate and a notification of the message is displayed on the system tray icon.

15. The method of claim 14, further comprising:
displaying via a graphical representation on the reporting user interface the percentage of the number of instances as one or more of a measure of participation concurrently with percent favorable rating.

16. The method of claim 15, further comprising:
updating the sentiment comparison in real-time based on an updated percentage of the number of instances.

17. The method of claim 1, wherein the user is a member of an organization having an organizational hierarchy.

18. A method of presenting organizational sentiment to an authorized, comprising:
authenticating one or more first users on respective first electronic devices, wherein the one or more first users are members of an organization
rendering, on the first electronic devices, a display that includes a status submission user interface including a plurality of user-sentiment icons;
detecting, on each of the respective first electronic devices, a selection of one of the user-sentiment icons;
transmitting, by the respective first electronic devices, to a server, status data associated with the authenticated first users of the each of respective first electronic devices and the detected selection of one of the user-sentiment icons to a server;
authenticating a second user on a second electronic device, wherein the second user is a member of the organization;
receiving, at the server, instructions associated with the second electronic device to render on a display of the second electronic device, reporting data associated with the status data, wherein the reporting data includes:
a percentage of a number of times each one of plurality of user-sentiment icons was selected by the first users based upon a position of the first users in the organization relative to other user-sentiment icons;
comparing in real-time the percentage of the number of times with a percentage of a number of times one or more other users to generate a sentiment comparison;
rendering, on the display of the second electronic device, the reporting data; and
without receiving additional instructions to render a display on the second electronic device, updating the reporting data displayed on the second electronic device to reflect status data transmitted to the server after the receiving, at the server, of instructions associated with the second electronic device to render, on the display of the second electronic device, the reporting data and the sentiment comparison as a percentage change over a predetermined period of time.

19. The method of claim 18 wherein the reporting data rendered on the display of the second electronic device is rendered as an active user interface that is selectable to display further information about the reporting data.

20. The method of claim 19, wherein the status submission user interface is configured to receive text input from the respective first user and the further information about the reporting data includes at least a portion of the text input.

* * * * *